US008505077B2

United States Patent
Kulkarni et al.

(10) Patent No.: US 8,505,077 B2
(45) Date of Patent: *Aug. 6, 2013

(54) ACQUISITION OF AUTHENTICATION RULES FOR SERVICE PROVISIONING

(75) Inventors: Rajandra Laxman Kulkarni, Burlington, MA (US); Adam Greenberg, Lincoln, MA (US); Anthony M. Marotto, Cambridge, MA (US); Alexander L. Popowycz, North Easton, MA (US); Michael Francis LoPiano, Westwood, MA (US)

(73) Assignee: FMR LLC, Boston, MA (US)

( * ) Notice: Subject to any disclaimer, the term of this patent is extended or adjusted under 35 U.S.C. 154(b) by 815 days.

This patent is subject to a terminal disclaimer.

(21) Appl. No.: 11/742,940

(22) Filed: May 1, 2007

(65) Prior Publication Data
US 2008/0109873 A1 May 8, 2008

Related U.S. Application Data

(63) Continuation of application No. 11/593,992, filed on Nov. 7, 2006.

(51) Int. Cl.
*H04L 29/06* (2006.01)

(52) U.S. Cl.
USPC ............ 726/5; 726/1; 726/2; 726/3; 709/225; 709/229

(58) Field of Classification Search
USPC ............... 709/223, 225, 229; 726/22, 1, 2, 726/3, 5
See application file for complete search history.

(56) References Cited

U.S. PATENT DOCUMENTS

| | | | |
|---|---|---|---|
| 5,805,801 A | 9/1998 | Holloway et al. ............. 713/201 |
| 6,189,032 B1 | 2/2001 | Susaki et al. | |
| 6,199,113 B1* | 3/2001 | Alegre et al. ................. 709/225 |
| 6,341,352 B1 | 1/2002 | Child et al. ................... 713/201 |
| 6,477,648 B1* | 11/2002 | Schell et al. ..................... 726/22 |
| 6,691,232 B1* | 2/2004 | Wood et al. ........................ 726/6 |
| 6,704,787 B1 | 3/2004 | Umbreit | |
| 7,043,230 B1 | 5/2006 | Geddes et al. | |
| 7,103,663 B2 | 9/2006 | Inoue et al. | |
| 7,140,045 B2 | 11/2006 | Gudorf et al. | |
| 7,334,254 B1 | 2/2008 | Boydstun et al. | |
| 7,373,671 B2 | 5/2008 | Gudorf et al. | |

(Continued)

OTHER PUBLICATIONS

Nov. 10, 2009 Office Action for U.S. Appl. No. 11/593,992.

(Continued)

*Primary Examiner* — Brandon Hoffman
*Assistant Examiner* — Thong Truong
(74) *Attorney, Agent, or Firm* — Proskauer Rose LLP

(57) ABSTRACT

Described are methods, systems, and apparatus, including computer program products for providing authentication for service provisioning. One or more executable authentication rules are provided for determining access by a user to one or more services. At least a first executable authentication rule is selected from the one or more executable authentication rules. The first executable authentication rule is for determining access by the user to at least a first service from the one or more services, wherein selecting the first executable authentication rule is based on: a characteristic of the user, a characteristic of a request, a characteristic of an acquisition point, or any combination thereof. A rules credential is generated. The rules credential includes the first executable authentication rule.

28 Claims, 27 Drawing Sheets

U.S. PATENT DOCUMENTS

| | | | |
|---|---|---|---|
| 7,444,518 | B1 | 10/2008 | Dharmarajan et al. |
| 2002/0004800 | A1* | 1/2002 | Kikuta et al. ............... 707/500 |
| 2002/0049907 | A1 | 4/2002 | Woods et al. |
| 2002/0147801 | A1* | 10/2002 | Gullotta et al. ............. 709/223 |
| 2002/0156879 | A1* | 10/2002 | Delany et al. ............... 709/223 |
| 2002/0165960 | A1 | 11/2002 | Chan ........................... 709/225 |
| 2003/0005135 | A1 | 1/2003 | Inoue et al. |
| 2003/0154406 | A1 | 8/2003 | Honarvar et al. |
| 2004/0010724 | A1 | 1/2004 | Brown et al. ................. 726/1 |
| 2005/0273442 | A1 | 12/2005 | Bennett et al. |
| 2006/0206717 | A1 | 9/2006 | Holt et al. |
| 2007/0033643 | A1* | 2/2007 | Rossi et al. ................... 726/10 |
| 2007/0143824 | A1 | 6/2007 | Shahbazi ....................... 726/1 |
| 2007/0162766 | A1 | 7/2007 | Watanabe |

OTHER PUBLICATIONS

Nov. 3, 2009 Office Action for U.S. Appl. No. 11/742,923.
Jan. 4, 2010 Office Action for U.S. Appl. No. 11/742,891.
Jan. 4, 2010 Office Action for U.S. Appl. No. 11/742,912.
Apr. 1, 2010 Office Action for U.S. Appl. No. 11/742,959.
International Search Report for International Application No. PCT/US2007/080645 dated Feb. 26, 2008.
"IBM Tivoli Software Presentation", 2007.
Jul. 20, 2010 Office Action for U.S. Appl. No. 11/593,992 (15 pages).
Jul. 27, 2010 Office Action for U.S. Appl. No. 11/742,891 (19 pages).
Jul. 19, 2010 Office Action for U.S. Appl. No. 11/742,912 (11 pages).
Aug. 11, 2010 Office Action for U.S. Appl. No. 11/742,923 (31 pages).
Aug. 30, 2010 Office Action for U.S. Appl. No. 11/742,959 (14 pages).
Apache HTTP Server Version 1.3, Authentication, Authorization, and Access Control, downloaded Apr. 23, 2011, 16 Pages.
Committee on National Security Systems, CNSS Instruction No. 4009, National Information Assurance (IA) Glossary, Apr. 26, 2010, 103 Pages.
MacGregor et al., NIST Special Publication 800-103, Draft, An Ontology of Identity Credentials Part 1: Background and Formulation, Oct. 2006, 70 Pages.
Authentication vs. Authorization, http://www.duke.edu/~rob/kerberos/authvauth.html, downloaded Apr. 23, 2011, 2 Pages.
Burr et al., NIST Special Publication 800-63 Version 1.0.2, Electronic Authentication Guideline, Apr. 2006, 64 Pages.

* cited by examiner

ACQUISITION OF AUTHENTICATION RULES FOR SERVICE PROVISIONING

RELATED APPLICATIONS

This application is a continuation application of, and claims priority to, U.S. patent application Ser. No. 11/593,992, filed Nov. 7, 2006, the disclosure of which is incorporated herein by reference in its entirety.

FIELD OF THE INVENTION

The present invention relates generally to computer-based methods and apparatuses, including computer program products, for acquiring authentication rules for service provisioning.

BACKGROUND

Hackers are becoming increasingly adept at identity theft in electronic commerce. Viruses, Trojan horses, worms, and spyware are used by hackers to install malware programs on consumers' systems to look for consumers visiting electronic commerce sites and entering their credentials. Malware programs can collect consumers' authentication data and other sensitive data by monitoring the keystrokes typed in by the user and sending them back to the hacker. The hacker is then able to log in to the consumers' accounts to damage or disrupt it (e.g., steal from it). Explicit sharing by the consumer, capture by man-in-the-middle devices, and guessing are other means used to compromise sensitive data. The compromises of authentication credentials expose service providers and their customers to the potential for financial loss and identify theft.

With respect to providing secure electronic commerce, service providers implement rigid authentication processes for their consumers to access their services. Typically, the authentication process involves a customer identifier and a password known only to the consumer. For more sensitive electronic commerce areas, a multi-factor authentication process is used involving, for example, a hard-token in addition to the traditional username and password.

SUMMARY OF THE INVENTION

One approach to providing customizable authentication for service provisioning is to enable a user to customize an authentication system. In one aspect, there is a computerized method. The method includes enabling a first user to customize an authentication system associated with a service type. Customizing the authentication system includes defining one or more authentication rules for determining access for a second user to a service for the service type.

In other examples, any of the aspects above can include one or more of the following features. The first user can include a consumer organization or an organization subgroup of the consumer organization. The first and second user can include an individual consumer. The second user can include one or more individual consumers of the first user. The method can further include enabling the second user to customize the authentication system associated with the service type. The one or more authentication rules comprise: a mandatory rule, an optional rule, or any combination thereof.

In addition, the method can further include receiving, from the second user, a request for the service at an enforcement point. The method can further include generating a rules credential including the one or more authentication rules. Generating the rules credential can be based on: a characteristic of the second user, a characteristic of the request, a characteristic of the enforcement point, or any combination thereof. The characteristic of the second user can include an identification credential of the second user, an identification credential of a group of users including the second user, or any combination thereof. The characteristic of the request can include: an access-channel characteristic, an access-point characteristic, a device characteristic, or any combination thereof. The characteristic of the enforcement point can include: a time characteristic, a day characteristic, a policy characteristic, a service type characteristic, a function type characteristic, or any combination thereof. The method can further include receiving, from the second user, a second request for a second service at a second enforcement point different from the first enforcement point. The second request can include the rules credential. The method can further include executing, at the second enforcement point, at least one of the one or more authentication rules included in the rules credential.

In various embodiments, the method can further include receiving, from the second user, a request for the service at an enforcement point. The method can further include determining if the one or more authentication rules apply to the second user at the enforcement point. The method can further include executing an authentication action specified by the one or more authentication rules when the one or more authentication rules apply.

In some embodiments, determining if the one or more authentication rules applies can include determining if one or more triggers specified by the one or more authentication rules are triggered. The one or more triggers can include: a user trigger, a request trigger, an enforcement point trigger, a policy trigger, or any combination thereof. The request trigger can include: an access-channel trigger, an access-point trigger, a device trigger, or any combination thereof. The method can further include triggering the access-channel trigger when the second user attempts to access the service using: a web message, a universal resource locator (URL) message, electronic mail, text messaging, instant messaging, a session initiation protocol (SIP) message, a short message service (SMS) message, a multimedia messaging service (MMS) message, an enhanced messaging service (EMS) message, an IP multimedia system (IMS) message, a live voice call, an automated voice call, an interactive voice response (IVR) call, or any combination thereof. The method can further include triggering the access-point trigger when the second user attempts to access the service from a specified network access-point.

In various embodiments, the enforcement point trigger can include: a time trigger, a day trigger, a service type trigger, a function trigger, an expiration-of-time trigger, or any combination thereof. The method can further include triggering the service type trigger when the service type matches a specified service type. The specified service type can include: a retail services type, an employment services type, an insurance services type, or any combination thereof. The method can further include triggering the function trigger when the service matches a specified service. The specified service can include: a financial service, an accounting service, a personnel service, an administrative service, a trade service, or any combination thereof. The method can further include triggering the time or date triggers when the second user attempts to access the service during: a specified time range, a specified day of the week, a specified set of dates, or any combination thereof.

In various embodiments, the policy trigger can include a fraud trigger. Executing the authentication action can include blocking the second user from accessing the service, and directing the second user to a site different from the enforcement point. Executing the authentication action can also include providing access to the service to the second user, and executing a supplemental action when the second user accesses the service. The supplemental action can include a monitoring action.

In addition, the method can further include receiving, from the second user, a request for the service at an enforcement point. The method can further include determining if the second user satisfies the one or more authentication rules, and providing access to the service to the second user if the second user satisfies the one or more authentication rules. The method can further include executing a first authentication action if the second user does not satisfy the one or more authentication rules. The method can further include determining if the enforcement point includes an override, and providing access to the service to the second user if the enforcement point includes the override.

In some embodiments, the first authentication action can be specified by the one or more authentication rules. The first authentication action can be specified by the enforcement point. Determining if the second user satisfies the one or more authentication rules can include determining a satisfaction state of the one or more authentication rules. Executing the first authentication action can include redirecting the second user to an authentication site separate from the enforcement point. The method can further include modifying a satisfaction state of the one or more authentication rules based on a result of the first authentication action.

In various embodiments, the first authentication action can include: a hard token action, a soft token action, a personal identification number (PIN) action, a password (PW) action, a knowledge action, a biometric action, a modify-user information action, or any combination thereof. Determining if the second user satisfies the one or more authentication rules can include processing the one or more authentication rules in an order specified by one or more priority characteristics of the one or more authentication rules. The one or more priority characteristics can include: a priority code, a priority class, a priority type, a priority context, or any combination thereof.

Any of the above implementations can realize one or more of the following advantages. Customized authentication for service provisioning allows flexibility in the specification, evaluation, and satisfaction of authentication and navigation requirements. In addition, the above implementations can provide for the ability to incrementally introduce new forms of authentication into an already operable system and the ability to provide scalable, high-performance authentication implementations. In addition, customized authentication requirements applied to an individual or group of users allows a service provider flexibility when describing authentication requirements for various groups or classes of users. Granularity in the application to the users allows the service provider to provide different authentication requirements to different groups as necessary. In addition, enabling more than one entity to customize authentication requirements for the same user or group of users allows different entities the ability to construct rules relevant to their needs independently from the needs of other entities. In addition, enabling an entity to impose customized authentication requirements on a group of users specified by common characteristics allows imposing entities to define authentication requirements that vary across their universe of users and across the resources that they offer to users.

In addition, enabling an entity to impose customized authentication actions allows the entity to build authentication requirements using any of the supported mechanisms and to add new mechanisms without interfering with those already available in a system. In addition, enabling an entity to impose mandatory or optional authentication requirements on the entity's users allows the entity to create minimum standards for authentication and allows them the ability to offer a spectrum of additional services that provide the user with a spectrum of cost benefit choices. In addition, enabling an entity to structure authentication requirements to segment services under different authentication requirements allows the flexibility and ability to control user navigation based on characteristics of the user and characteristics of the services. In addition, authentication processing conducted locally at fulfillment processing locations allows service providers to scale the service delivery system to accommodate changing or growing loads. In addition, authentication grouping, imposed independently or jointly by different entities, improves the user experience by sharing the satisfaction of authentication requirements across aggregates of related requirements. In addition, prioritizing authentication rules based on authentication priority ensures that users perform actions in a desired sequence relative to other actions.

In addition, enabling different fulfillment types of authentication rules allows imposing entities to either attach actions to the normal flow of user navigation or enforce navigational restrictions. The variety of fulfillment options offered allows imposing entities flexibility in specifying the time extent of authentication requirements and the ability to impose, quickly and easily, local actions or restrictions on classes of users. This also can allow imposing entities to react and respond to changing conditions simply by introducing new or changed authentication requirements, while not changing the service delivery machinery. In addition, authentication triggering allows imposing entities extensive options for specifying when and where users must respond to authentication requirements. The various criteria can allow imposing entities to restrict authentication requirements to only those conditions to which they meaningfully apply. In addition, authentication requirements based on a source address of the user allows an imposing entity or service provider the ability to reduce exposure to problems by monitoring or restricting admittance based on information mined from previous experience across the available resources or from outside knowledge gained from commercial protection or law enforcement agencies.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
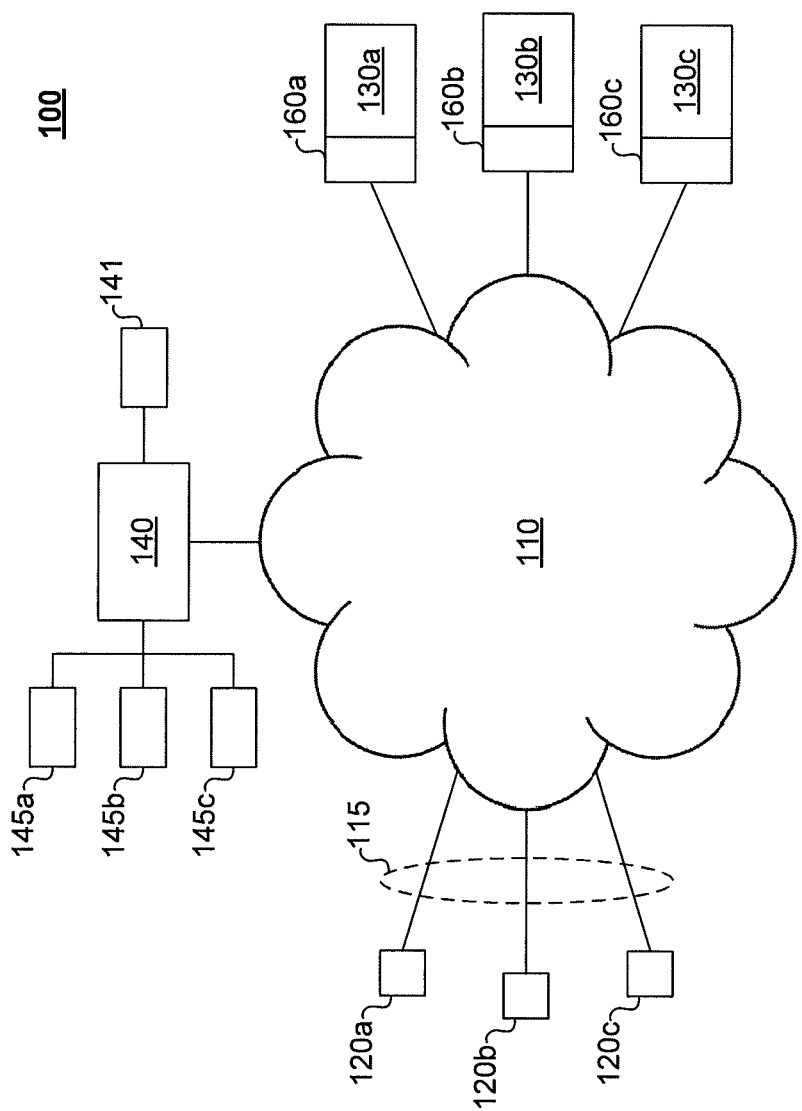
FIG. 1 is a block diagram showing an exemplary network with devices relating to customizable authentication for service provisioning.

FIG. 1 is a block diagram showing an exemplary network 100 with devices relating to customizable authentication for service provisioning. The network 100 includes a transmission medium 110, one or more user devices 120a, 120b, and/or 120c, generally 120, one or more servers 130a, 130b, and/or 130c, generally 130, at least one authentication server 140, a rules server 141, and/or one or more device managers 145a, 145b, and/or 145c, generally 145. The transmission medium 110 is responsible for the transfer of information between one or more of the user devices 120, one or more of the servers 130, the authentication server 140, the rules server 141, and/or one or more of the device managers 145.

Information transfer over the transmission medium 110 can be based on one or more communication protocols and/or communication modes. Communication protocols can include, for example, Internet Protocol (IP), Voice over IP (VOIP), Peer-to-Peer (P2P), Hypertext Transfer Protocol (HTTP), Session Initiation Protocol (SIP), Really Simple Syndication (RSS), podcasting, Signaling System #7 (SS7), Global System for Mobile Communications (GSM), Push-to-Talk (PTT), PTT over Cellular (POC), and/or other communication protocols. Communication modes can range from textual modality (e.g., electronic mail and/or instant messaging) to graphical modality (e.g., still and/or moving pictures) to audio modality (e.g., voice calls), or any combination thereof.

The transmission medium 110 can include one or more packet-based networks and/or one or more circuit-based networks in any configuration. Packet-based networks can include, for example, the Internet, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks.

The transmission medium 110 can be coupled to the user devices 120 by connections 115. The user devices 120 can be computers, telephones, IP phones, mobile devices (e.g., cellular phones, personal digital assistant (PDA) devices, laptop computers, and/or the like), and/or other communication devices. Connections 115 can include electrical wires, optical fibers, and/or wireless transmissions. User devices 120 can be identified by a unique and/or shared identifier. A unique user device identifier can be, for example, a telephone number, an IP address, and/or the like. A shared user device identifier can be, for example, a network address, an area code, a country code, and/or the like.

The transmission medium 110 can also be coupled to one or more servers 130. The servers 130 can include, for example, web servers, application servers, media servers, gateways, softswitches, and/or the like. A server 130 can be responsible for providing one or more types of services to a consumer using one or more of the user devices 120. Types of services can include, for example, financial services, accounting services, transaction services, communication services, database services, administrative services, and/or other electronic services. Financial services can include banking services, investing services (e.g., stock trading), accounting services, electronic funds transfer services, insurances services, employee information services (e.g., employee benefits), institutional services, administrative services, and/or other electronic services. Transaction services can include shopping, selling goods, trading goods, and/or the like. Communication services can include voice communication (e.g., Voice over IP (VOIP)), data communication, multimedia communication (e.g., video conferencing), networking (e.g., social networking, blogging, etc.), and/or the like. Database services can include library services, research services, news services, and/or the like. In one configuration, for example, server 130a can be a website for a bank providing financial services associated with checking and savings accounts of individual consumers. In another configuration, server 130b can be a website for a car insurance unit of an insurance company providing insurance services associated with an insurance policy for a group of small businesses. In yet another configuration, server 130c can be an automated phone server for an employer providing employee benefit services associated with the employees of the employer.

Each server 130a, 130b, and 130c can include, respectively, an authentication monitor 160a, 160b, and 160c, generally 160. An authentication monitor 160 can determine access to and navigation of one or more services provided by a server 130, by the enforcement and execution of authentication rules, discussed below. In the system 100, the authentication monitors 160 are illustrated to be included in the servers 130, but other configurations can also be used. For example, the authentication monitors 160 can be directly or indirectly connected to the respective servers 130.

The determination of access to and navigation of services on one or more servers 130 can be defined and controlled by one or more authentication rules. The authentication server 140 and/or the rules server 141 can be responsible for determining which authentication rules are associated with a user and acquiring the authentication rules when a user logs in and/or requests a service as they navigate the network 100. The authentication server 140 can also be responsible for executing one or more authentication rules at the time the user logs in to request a service from a server 130, or at any other time after the user is logged in as they navigate one or more services provided by one or more servers 130. One or more authentication rules can be stored on and retrieved from a rules server 141 and/or one or more device managers 145. The rules server 141 can be, for example, a repository database. In another configuration, the rules server 141 can be coupled to a repository rules database. A device manager 145 can be a server, a repository database, and/or the like.

In the system 100, the rules server 141 and the device managers 145 are illustrated to be directly connected to the authentication server 140, but other configurations can also be used. For example, the rules server 141 and/or one or more device managers 145 can be included in the authentication server 140, or can be directly or indirectly accessible by the authentication server 140 over the transmission medium 110. In addition, the system 100 also illustrates the authentication server 140 to be directly connected to the transmission medium 110, but other configurations can also be used. For example, the authentication server 140 can be indirectly connected to the transmission medium 110 and/or can be directly connected to or included in a server 130.

Figure 2:
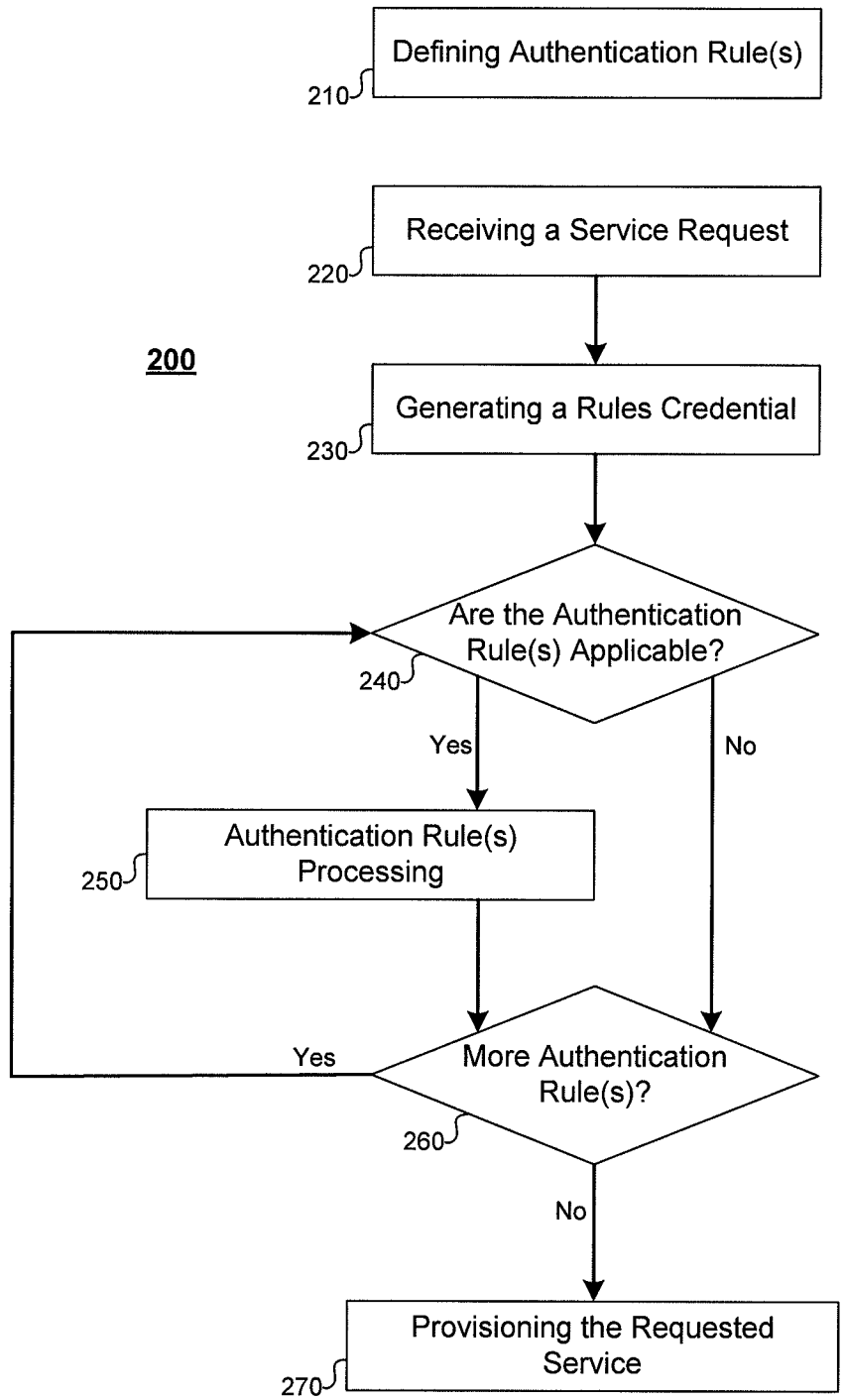
FIG. 2 illustrates a flowchart depicting authentication customization and service provisioning.

FIG. 2 illustrates a flowchart 200 depicting authentication customization and service provisioning. The elements of the flowchart 200 are described using the exemplary network 100 of FIG. 1. Customizable authentication includes defining one or more authentication rules (210). Service provisioning includes receiving, from a user, a request for a service (220), generating a rules credential that includes one or more authentication rules (230), determining whether one or more authentication rules apply (240), processing one or more applicable authentication rules if they apply (250), determining if more authentication rules are applicable (260), and/or provisioning the requested service (260).

A sponsoring user can define one or more authentication rules (210) to determine a consuming user's access to a service. A sponsoring user can include, for example, a client organization or company of a service provider, a unit or group of the organization or company (e.g., marketing group, research and development group, regional group, etc.), and/or one or more individual clients of a service provider. A sponsoring user can also include a service provider. A consuming user can include, for example, one or more individual consumers of the sponsoring user. The consuming user can also be defined according to specified user characteristics. User characteristics can include belonging to a certain organization or company (e.g., users associated with a company), belonging to a group or sub-group of an organization or company (e.g., full-time, part-time, or contracting employees), and/or belonging to other groups of individuals. For example, the sponsoring user can be an employer that uses a service provider to manage employee benefit services. In this example, a consuming user can be the group of all full-time employees. In another example, the sponsoring and consuming user can be the same individual. For example, the sponsoring and consuming user can be an individual consumer of an online trading service provider. In yet another embodiment, the consuming user can be enabled to further add, remove, and/or edit one or more of the authentication rules defined by the sponsoring user. In another embodiment, the sponsor can make one or more authentication rules to be either mandatory or optional for a consuming user.

Figure 3:
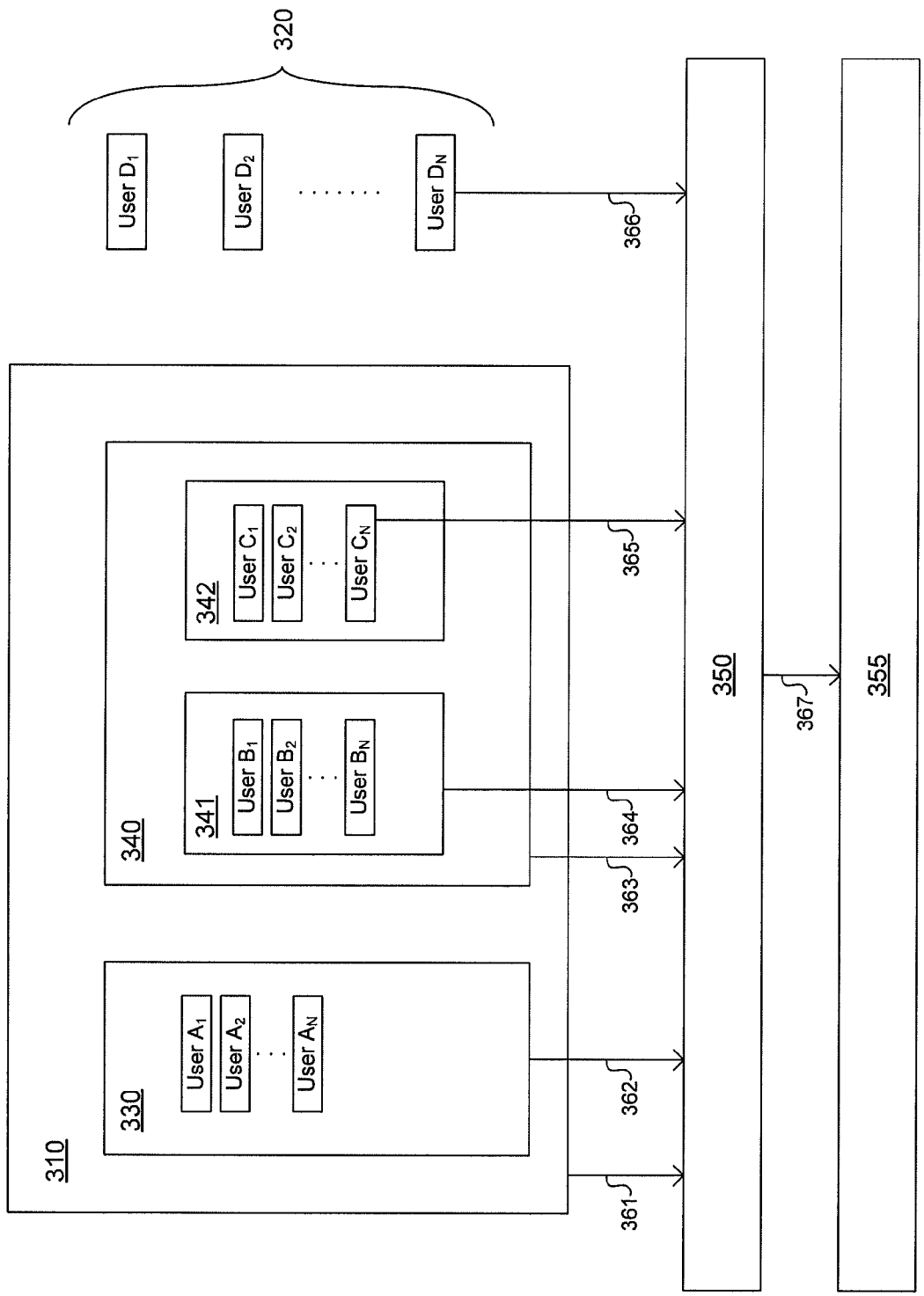
FIG. 3 illustrates exemplary relationships between rule-creating sponsors and consumers.

FIG. 3 illustrates exemplary relationships between rule-creating sponsors and consumers. Sponsoring users can include an organization 310 and/or one or more individual users 320. The organization 310 includes sponsoring business units 330 and 340, which, in turn, can include one or more individual users. The sponsoring business unit 340 includes sub-organization and/or client groups 341 and 342. The sponsoring entities can generate or edit authentication rules using a rules manager 350. For example, the sponsoring organization 310 can customize (361) an authentication rule for one or more users in the enterprise 310 (i.e., any combination of users $A_i$, $B_i$, and/or $C_i$). The sponsoring business unit 330 can customize (362) an authentication rule for one or more users in the business unit 330 (i.e., any combination of users $A_i$). The sponsoring business unit 340 can customize (363) an authentication rule for one or more users in the business unit 340 (i.e., any combination of users $B_i$ and/or $C_i$). The sponsoring sub-organization or client 341 can customize (364) an authentication rule for one or more users in the sub-organization or client 341 (i.e., any combination of users $B_i$). The user $C_N$ in the sub-organization or client 342 can customize (365) an authentication rule to be applicable to user $C_N$. The individual user $D_N$ can also customize (366) an authentication rule to be applicable to user $D_N$. The rules manager 350 can generate (367) specific authentication rule instances for specific users (e.g., users associated with a unique user identifier), or can generate (367) authentication rule templates for an authentication rule associated with one or more other user characteristics. The generated authentication rules can be transferred to an active rules database 355.

Generally, authentication rules govern the behavior of components of the network 100 with respect to a user's access and navigation of the network 100. Specifically, an authentication rule can: define who the rule is to be associated with (e.g., a particular consumer), when it is to apply (e.g., when a consumer attempts to access a specific server 130 and/or a specific service on a server 130), what action needs to be performed (e.g., enter a hard token value), and/or how the action can be fulfilled (e.g., redirect the user to a specified universal resource locator (URL) message for entering a hard token value).

Figure 4:
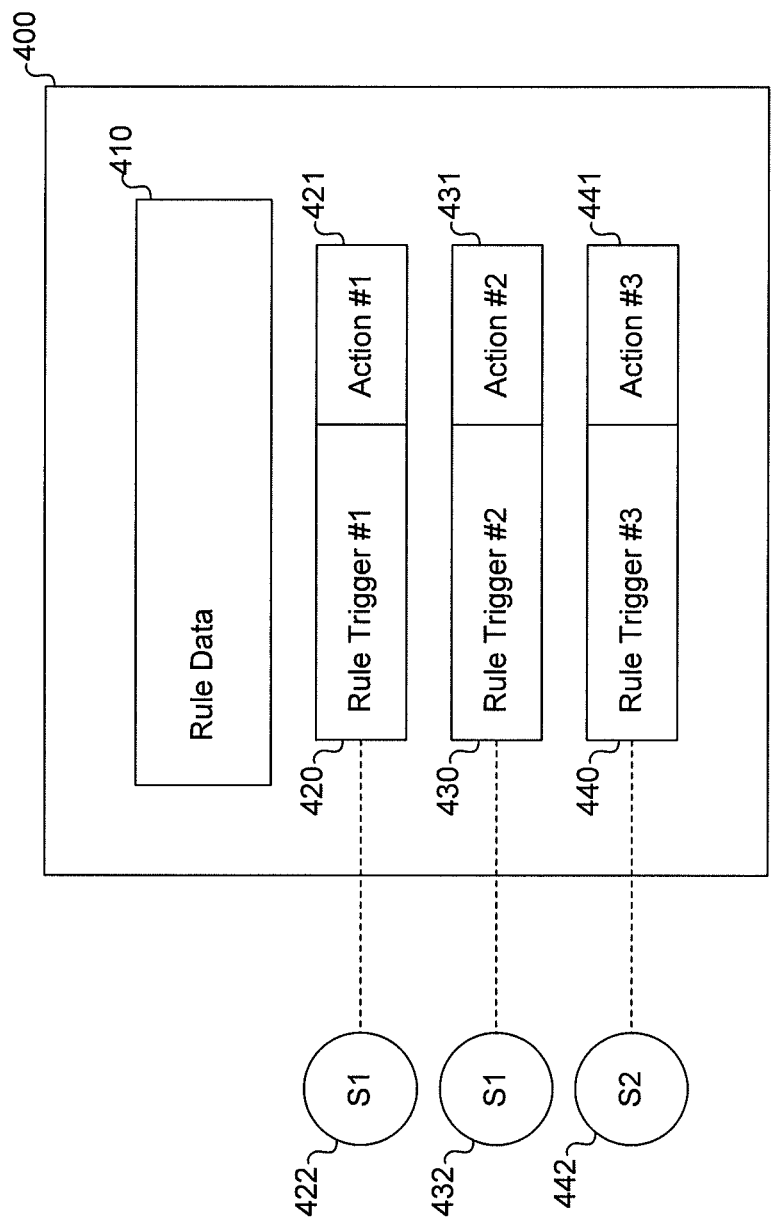
FIG. 4 illustrates an exemplary authentication rule.

FIG. 4 illustrates an exemplary authentication rule 400. The authentication rule 400 can include authentication rule data 410, one or more authentication rule trigger sets 420, 430, and 440, and/or one or more authentication rule instructions 421, 431, and 441, respectively associated with an authentication rule trigger. In a supplemental or alternative embodiment, one or more authentication instructions can be associated with an authentication trigger. In a further supplemental or alternative embodiment, one or more authentication states 422, 432, and 442, can be associated with or included in, respectively, one or more authentication rule trigger sets 420, 430, and 440.

Authentication rule data 410 can define what entity (i.e., consuming user) the authentication rule 400 is to be associated with when that entity requests a service and/or logs on to a system. The authentication rule data 410 can also state one or more authentication actions that need to be executed if the authentication rule 400 applies. Authentication actions can include, generally, any challenge that requires a response from the user. Specifically, authentication actions can include: a hard token action, a soft token action, a personal identification number (PIN) action, a password (PW) action, a knowledge action, a biometric action, a modify-user information action, and/or other actions. A hard token action can be implemented, for example, using a smart card and/or a token device. A soft token action can be implemented, for example, using an electronic certificate, an electronic credential, an electronic cookie, and/or the like. Knowledge actions can include, for example, question and answer actions. Modify-user information actions can include requesting the user to edit their user profile. Authentication actions can also include actions that do not require a response from a user. For example, a non-responsive actions can include blocking access to a service (e.g., a Navigation Restriction-type rule), monitor a user (e.g., an Information-type rule), and/or re-directing a user to a different resource. Navigation Restriction-type authentication rules can specify an action that limits a user's navigation across the network 100 by redirecting, for example, the user to a different site than the one requested. Information-type authentication rules can specify that an action is to be executed locally at an enforcement point.

Authentication rule data 410 can also include selection criteria based on one or more specified characteristics. Selection criteria can be used to select which authentication rules should be retrieved to be associated with a specific user, which can take place at the beginning of a session or during a session as the user navigates one or more services of the network 100. Selection criteria can include characteristics of a user, characteristics of a request for a service, characteristics of an enforcement point, and/or other characteristics. Characteristics of a user can include a user identification, an organization or sub-organization identification, and/or other identifiers.

Characteristics of a request can include an access-channel characteristic, an access-point characteristic, a user device characteristic, and/or the like. Access-channel characteristics can include, for example, accessing a service using one or more of: a web message, a universal resource locator (URL) message, electronic mail, text messaging, instant messaging, a session initiation protocol (SIP) message, a short message service (SMS) message, a multimedia messaging service (MMS) message, an enhanced messaging service (EMS) message, an IP multimedia system (IMS) message, a live voice call, an automated voice call, an interactive voice response (IVR) call, and/or the like.

Access-point characteristics can include, for example, requests originating from a specified address (e.g., IP address, telephone number, etc.), a specified network address (e.g., IP network addresses, area codes, country codes, etc.), and/or the like. Device characteristics can include, for example, software characteristics (e.g., browser agent), hardware characteristics (e.g., brand, model, version, etc.), and/or the like. Characteristics of an enforcement point can include, for example, time(s) of a day, day(s) of a week, a policy characteristic (e.g., a sponsor or owner of the service/resource), a service type characteristic (e.g., banking), a function type characteristic (e.g., setting up a new account), and/or the like.

Authentication rule trigger sets 420, 430, and/or 440, can define when the authentication rule 400 applies at one or more enforcement points. The enforcement points (e.g., an authentication server 140 or an authentication monitor 160) can include enforcement contexts that if they match up with one or more triggers in the sets 420, 430, and/or 440, then the authentication rule 400 is triggered and executed. The authentication rule trigger sets can be inclusive, exclusive, or any combination thereof. For example, if the authentication rule trigger set 420 is inclusive, then the authentication rule 400 is triggered when some enforcement point context matches any one of the triggers in the set 420 (i.e., boolean 'OR' logic). If the authentication rule trigger set 430 is exclusive, then the authentication rule 400 is triggered when no context or user authentication value matches any one of the triggers in the set 430 (i.e., boolean "AND NOT" logic). Generally, any boolean expression can be used with one or more triggers in one or more trigger sets to activate an authentication rule. If no triggers are included in an authentication trigger set 420, 430, and/or 440, then by default, the authentication rule 400 can be triggered everywhere.

Authentication rule trigger sets 420, 430, and/or 440 can include, for example, one or more of: a user trigger, a request trigger, an enforcement point trigger, a policy trigger, and/or the like. A user trigger can include a user identification, an organization or sub-organization identification, and/or other identifiers. A request trigger can include an access-channel trigger, and access-point trigger, a user device trigger, and/or the like. Access-channel triggers can include access-channel characteristics, as described above. Access-point triggers can include access-point characteristics, also described above. Device triggers can include device characteristics, also described above. Enforcement point triggers can include, for example, expiration time(s) trigger, time(s) of a day trigger, day(s) of a week trigger, a service type trigger, a function type trigger, and/or the like. A policy trigger can include a sponsor trigger, a resource owner trigger, and/or the like. Triggers can also specify execution of the authentication rule 400 during login process (i.e., front door processing) and/or during subsequent user navigation of the network 100 (i.e., deferred processing).

Authentication rule instructions 421, 431, and/or 441, can define how the authentication rule 400 can be fulfilled. Authentication rule instructions 421, 431, and/or 441, can include one or more instructions to be performed locally and/or remotely, and/or can include a link (e.g., a URL) to a different enforcement point in the network 100. Enforcement points can include, for example, an authentication server 140, a device manager 145, and/or an authentication monitor 160. If the authentication rule 400 does not have an authentication action specified, then an enforcement point can use a default action. For example, an authentication monitor 160 can, by default, direct a user to the authentication server 140 in cases where an authentication rule specifies no actions. In a supplemental or alternative embodiment, enforcement points can execute a default action even if the authentication rule 400 specifies an action.

Authentication rule states 422, 432, and/or 442, can be used in the selection and acquisition of the associated authentication rule triggers (420, 430, and 440) and rule actions (421, 431, and 441). For example, if the authentication rule 400 is in state 'S1', then only rule triggers 422 and 423, and associated rule actions 421 and 431 will be selected for retrieval. Authentication rule states 422, 432, and 442, can be stored in the rules server 141 and/or one or more device managers 145. Authentication rule states 422, 432, and 442, can also be associated with specific users, in which case a rule instance including the state can also be stored on the rules server 141. Persistent-type authentication rules, which are those rules whose state can remain unchanged across sessions, can be represented by the authentication states 422, 432, and/or 442, of an authentication rule 400. In some embodiments, the authentication rule 400 can transition from one state to the another state when, for example, the authentication rule 400 is satisfied and/or an expiration period elapses. In some configurations, authentication states can be associated with either persistent-based or session-based authentication rules. State-transitioning allows for lifecycle management of the authentication rule 400 in a workflow.

Tables I-III below illustrate examples of different authentication rules. The elements of the Tables I and II are described using the exemplary authentication rule 400 of FIG. 4.

TABLE I

Token Rule

Rule Data 410
   RuleName: RetailToken
   User: RetailConsumers
   Owner: Retail
   OwnerType: Realm
   Class: Session

| State 422 | Rule Trigger 420 | Rule Action 421 |
|---|---|---|
| S0 | <empty> | <empty> |
| S1 | LoginMethod=U/PW | Reminder URL |
| S2 | LoginMethod=U/PW | Token URL |
| S2 | Realm=Retail | Token URL |
| S3 | <empty> | <empty> |

Table I illustrates an example of a Token authentication rule sponsored by the Retail realm. The rule is acquired for all Retail consumers for each independent session. This rule specifies four states: S0—Token in Inventory, S1—Token Sent to User, S2—Token Activated, and S3—Token Discarded. The Token action includes two states (S0 and S3) that do not require actions at an enforcement point. The state of the rule changes from S0 to S1 when a user enrolls for a token. In state S1, the authentication rule requires an enforcement point to display a reminder-to-active message to the user whenever the user logs in using username and password. The state changes from S1 to S2 when a user activates a token. In state S2, the authentication rule requires an enforcement point to query the user for a passcode whenever the user logs in using username and password (e.g., at authentication server 140) or whenever the user visits a Retail resource (e.g., a server 130 associated with Retail). The state changes from S2 to S3 when a user un-subscribes.

TABLE II

Fraud Rule

Rule Data 410
    Rule Name: FraudIPBlock
    Owner: StockTrader
    OwnerType: Realm
    Class: NavRestrict
    Source: IP = {10.24.189.*, 189.1.1.10-189.1.2.21}
Rule Trigger 420    Rule Action 421
    <empty>    CallRepMessageURL Table II illustrates an example of a Fraud authentication rule sponsored by the StockTrader realm. The rule is acquired for all requests that have a source IP address in a specified range (where '*' indicates a wildcard and can include all hosts from 0-255). This rule does not include any rule triggers, so by default all enforcement points will re-direct the user to a CallRep site indicating, for example, that their account is under a Fraud watch and what options they have to correct the matter.

TABLE III

User-Customizable Token Rule

Rule Data 410
    RuleName: CustomRetailToken
    User: RetailConsumers
    Owner: Retail
    OwnerType: Realm
    Class: Session

| State 422 | Rule Trigger 420 | Rule Action 421 |
|---|---|---|
| S0 | <empty> | <empty> |
| S1 | LoginMethod=U/PW | Reminder URL |
| S2 | LoginMethod=U/PW | RSAToken URL |
| S2 | Realm=Retail | RSAToken URL |
| S3 | LoginMethod=U/PW | VerToken URL |
| S3 | Realm=Retail | VerToken URL |
| S4 | <empty> | <empty> |

Table III illustrates an example of a user-customizable Token authentication rule sponsored by the Retail realm. The rule is identical to the rule illustrated in Table I, except that in this scenario, Retail has given the customer an option of what kind of token to use: an RSA Token or a Verisign Token. When the user is in state S1, the reminder action can ask the user what type of Token they have, after which the state is changed to either state S2 or S3 depending upon the response.

Returning to the flowchart 200 illustrated in FIG. 2, service provisioning can include receiving, from a user, a request for a service (220), optionally generating a rules credential that includes one or more authentication rules (230), determining whether one or more authentication rules apply (240), processing one or more applicable authentication rules if they apply (250), determining if more authentication rules are applicable (260), and/or provisioning the requested service (260).

Receiving a request for a service (220) can include any request for information exchange with one or more servers 130, the authentication server 140, one or more device managers 145, and/or one or more authentication monitors 160. The request for service can be the initial login request to the authentication server 140. The request for service can also take place after the initial login process, in which case the request can include a rules credential, discussed below.

Generating a rules credential that includes one or more authentication rules (230) can include generating a new rules credential (e.g., at initial login) and/or updating and re-generating the rules credential included in the request. A rules credential can include one or more authentication rules associated with a user based on selection criteria described in the authentication rule data section of an authentication rule (e.g., unique user identifiers and/or other characteristics). The rules server 141 can retrieve one or more authentication rules associated with the user. In a supplemental or alternative embodiment, a rules credential can include a compressed form of one or more authentication rules. For example, the compressed form can leave out one or more authentication actions in which case the enforcement point that evaluates the authentication rule will need to perform a default action.

In a supplemental or alternative embodiment, an authentication rule and/or a rules credential can also include the satisfaction state of an authentication rule. For example, for a session-based token authentication rule, a user can be required to enter in a token value once for each session. Initially, the generated rules credential will mark the token rule as unsatisfied. However, once the user correctly enters the appropriate token value, the token authentication rule can be marked as satisfied. Enforcement points will allow access to their services when they see that an authentication rule is satisfied, as described below. An authentication rule and/or a rules credential can also include a grouping identifier in relation to the satisfaction state of an authentication rule. For example, if a user is associated with more than one authentication rule that defines the same action and include the same group identifier, then when the user satisfies one authentication rule both authentication rules can be marked satisfied.

Table IV illustrates a satisfaction group example, in which three authentication rules have been defined including the same action (Token). The first authentication rule (for Retail resources) and the second authentication rule (for Institutional resources) are assigned to a common satisfaction group ('0'). The third authentication rule (for personal transactions) is assigned to a separate group ('1'). If the user satisfies either of the first or second authentication rules then the enforcement point can mark both satisfied in the rules credential for the user. The third authentication rule will remain unsatisfied until an enforcement point determines that its trigger set applies.

TABLE IV

Satisfaction Group Example

| Action | Group | TriggerSet | Instructions |
|---|---|---|---|
| Token | 0 | realm=Retail | tokenURL |
| Token | 0 | realm=Instit | tokenURL |
| Token | 1 | trans=personal | tokenURL |

A rules credential can be transferred to the requesting user (e.g., as a web cookie) such that the authentication rules are portable and can travel with the user. In such a scenario, a user can navigate from resource to resource on the network 100 without having to interact with a central authentication server for every request for a service. For example, the authentication server 140 can initially process an authentication rule included in a rules credential that applies during the login process. If a rule does not apply at login time, it can remain in the rules credential for later use by one or more authentication monitors 160. As the user navigates resources around the network 100, the authentication monitors 160 defending the resources in respective servers 130 can evaluate the authentication rules included in the rules credential and determine if they apply. When an authentication monitor 160 determines that an authentication rule applies, the authentication monitor 160 can execute the authentication rule.

A rules credential can also specify a processing order that one or more authentication rules should be processed. The order that one or more authentication rules are processed can be based on a priority code included in an authentication rule's data, the owner or sponsor of the authentication rule (e.g., provider/realm/client/user), the name of an action included in the authentication rule, or it can be based on one or more other elements of an authentication rule. For example, the rules credential can be generated such that all persistent-based rules are processed before all session-based rules. Rule priority can be an arbitrary value assigned by the creator of the authentication rules to order the authentication rule relative to other authentication rules.

An enforcement point can determine whether one or more authentication rules apply (240) based on information in one or more authentication rule triggers in an authentication rule and on information stored in the context of the enforcement point, as described above. If an authentication rule is applicable, the authentication rule is processed based on one or more authentication instructions specified by the authentication rule (250). After the authentication rule is processed, the rules credential can be re-acquired (230) to update any state change associated with the user. If un-processed authentication rules are left in the rules credential (260), the enforcement point performs elements (240) and (250). If no applicable authentication rules remain (260), then the requested service can be provisioned to the user (270).

USE CASE EXAMPLES

FIGS. 5-25 illustrate flow diagrams depicting use case examples for authenticated service provisioning. The elements of the flow diagrams in FIGS. 5-25 are described using the exemplary network 100 of FIG. 1. In these examples, each resource is illustrated to reside on a separate server (e.g., one of servers 130a-c). However, one or more resources can also reside on the same server and the use case examples can equally be applied as such.

Use Case 1: Initial Rule Acquisition

Figure 5:
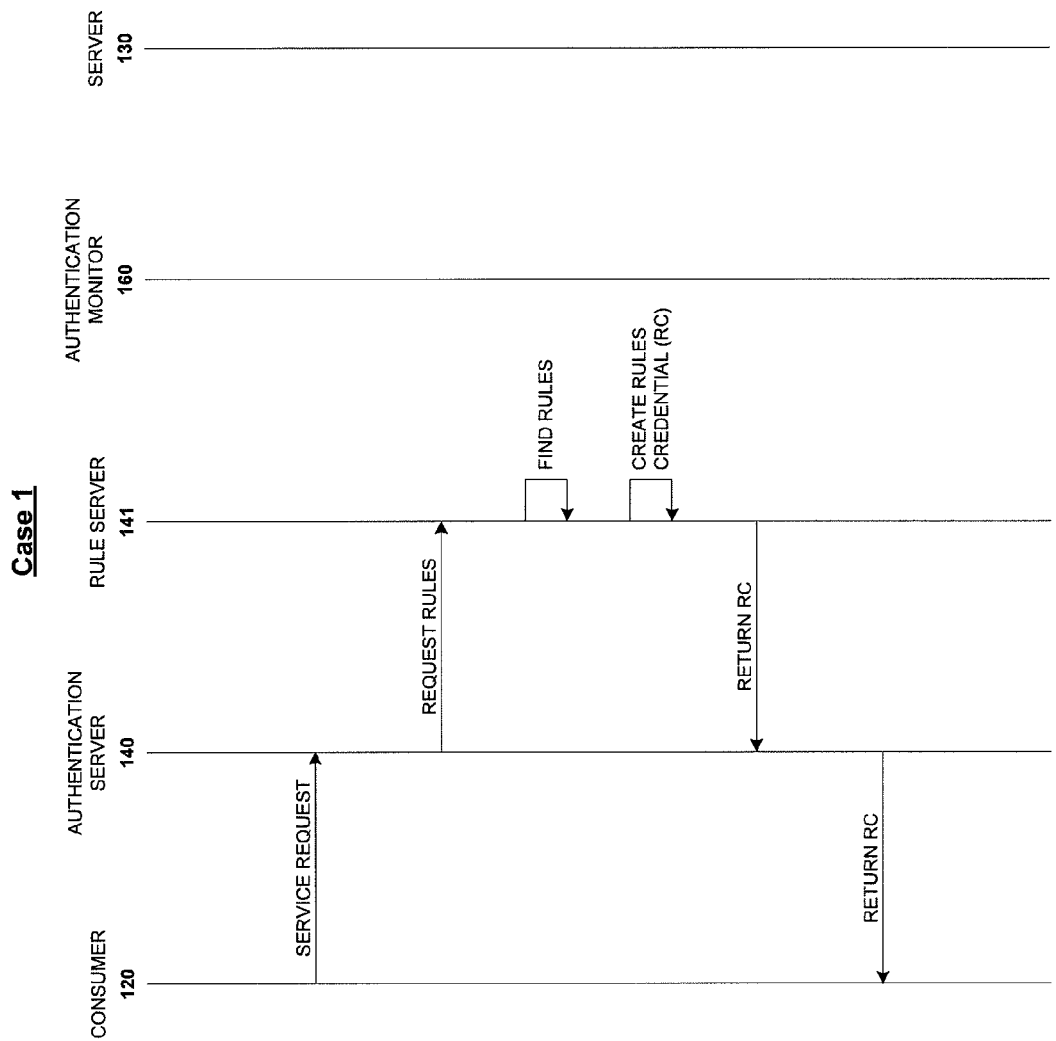
FIGS. 5-25 illustrate flow diagrams depicting use case examples for authenticated service provisioning.

FIG. 5 illustrates a flow diagram depicting initial authentication rule acquisition. A consumer using a user device 120 logs in to the authentication server 140. The initial request can include a user identification (e.g., username or userid), a password, and/or authentication context data. Authentication context data can include data characterizing: the authentication method, the access-channel, the access-location, the access-device, and/or the user role (e.g., customer, admin, etc.). The authentication server 140 forwards the user identification and authentication context data to the rules server 141 to retrieve the authentication rules associated with the consumer and/or the context. The rules server 141 can access a local or remote rules repository database to find the relevant authentication rules. The rules server 141 can generate a rules credential that includes the authentication rules. If more than one authentication rule was acquired, the rules server 141 can order the authentication rules in the rules credential based on, for example, a priority code, a type, a group code, and/or an action name of the authentication rules. The rules server 141 returns the rules credential to the authentication server 140. Either the rules server 141 and/or the authentication server 140 can perform further processing on the rules credential (e.g., compression or rule ordering). The authentication server 140 returns the rules credential to the user 120.

Use Case 2: Rule Update Acquisition

Figure 6:
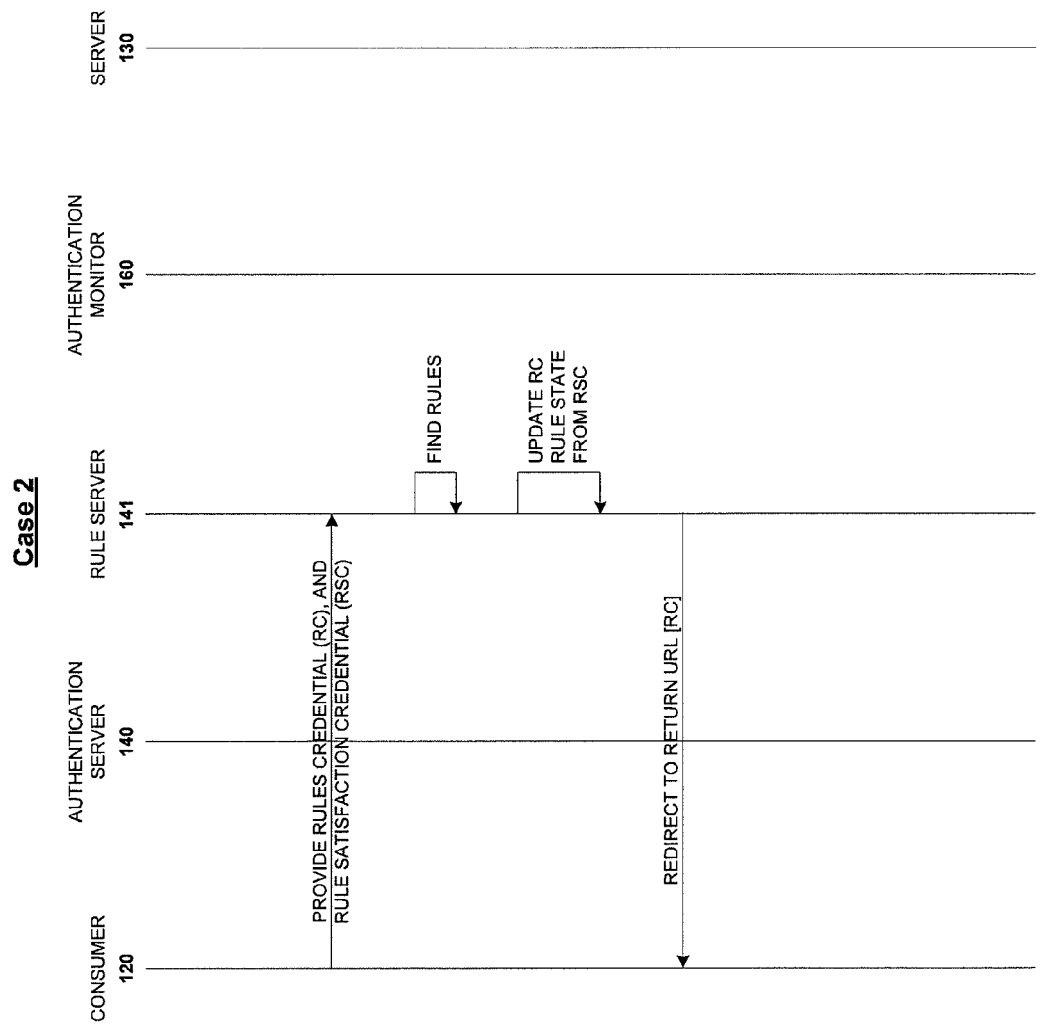

FIG. 6 illustrates a flow diagram depicting reacquiring a rules credential, which can include generating a new rules credential or updating an existing rules credential. The user 120 provides a rules credential and/or a rule satisfaction credential to the rules server 141. The rule satisfaction credential can be generated by another component in the network 100 to indicate that one or more authentication rules in the rules credential have been satisfied or not. The request to the rules server 141 can also include authentication context data as described above. The rules server 141 can access a local or remote rules repository database to find the relevant authentication rules. The rules server 141 generates a new rules credential or updates the existing rules credential to include the authentication rules. The satisfaction state of the authentication rules in the new rules credential are set based on the rule satisfaction credential received from the user as well as the current satisfaction state in the previous rules credential. For example, a user that successfully entered a token passcode will receive a rule satisfaction credential that the rules server 141 will use to mark the token authentication rule as satisfied. The rules server 141 can also update the state of a device (e.g., a hard token as: enrolled, activated, or discarded) in the respective device manager 145. The rules server 141 returns the rules credential to the authentication server 140.

Use Case 3S: Session-Type Rule Fulfillment

Figure 7:
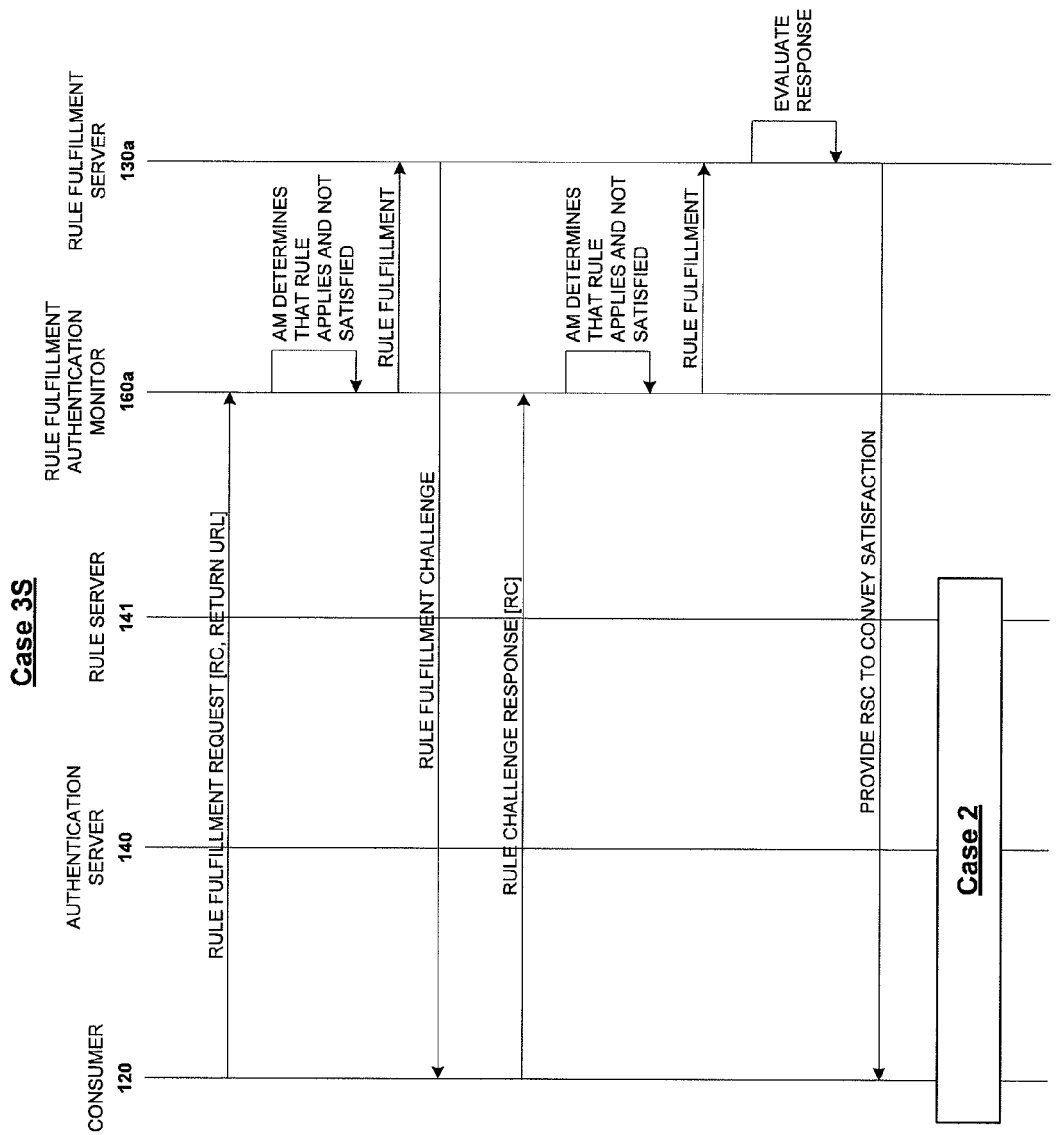

FIG. 7 illustrates a flow diagram depicting the fulfillment of a session-type authentication rule. A user 120 can be redirected by a resource to a rule fulfillment server 130a to enter, for example, a token passcode. The request includes a rules credential that, in turn, includes the authentication rule that is to be fulfilled. The authentication monitor 160a evaluates the authentication rules included in the rules credential and determines that an authentication rule applies (i.e., is triggered) and is not satisfied. However, since the rule fulfillment server 130a is the fulfillment point for the authentication rule, the authentication monitor 160a includes a specific override for the authentication rule and allows the user 120 to access the rule fulfillment server 130a. The rule fulfillment server 130a challenges the user 120 as indicated by the authentication rule (e.g., requesting a token passcode to be entered). The user 120 returns a response to the challenge. The authentication monitor 160a performs the same evaluation as described above and allows access to the rule fulfillment server 130a. The rule fulfillment server 130a evaluates the response and conveys the satisfaction state via a rule satisfaction credential (e.g., if the token passcode was correct then the rule satisfaction credential indicates the rule was satisfied). The rule fulfillment server 130a transmits the rule satisfaction credential to the user 120, who can then update their rules credential as illustrated in Case 2.

Use Case 3P: Persistent-Type Rule Fulfillment

Figure 8:
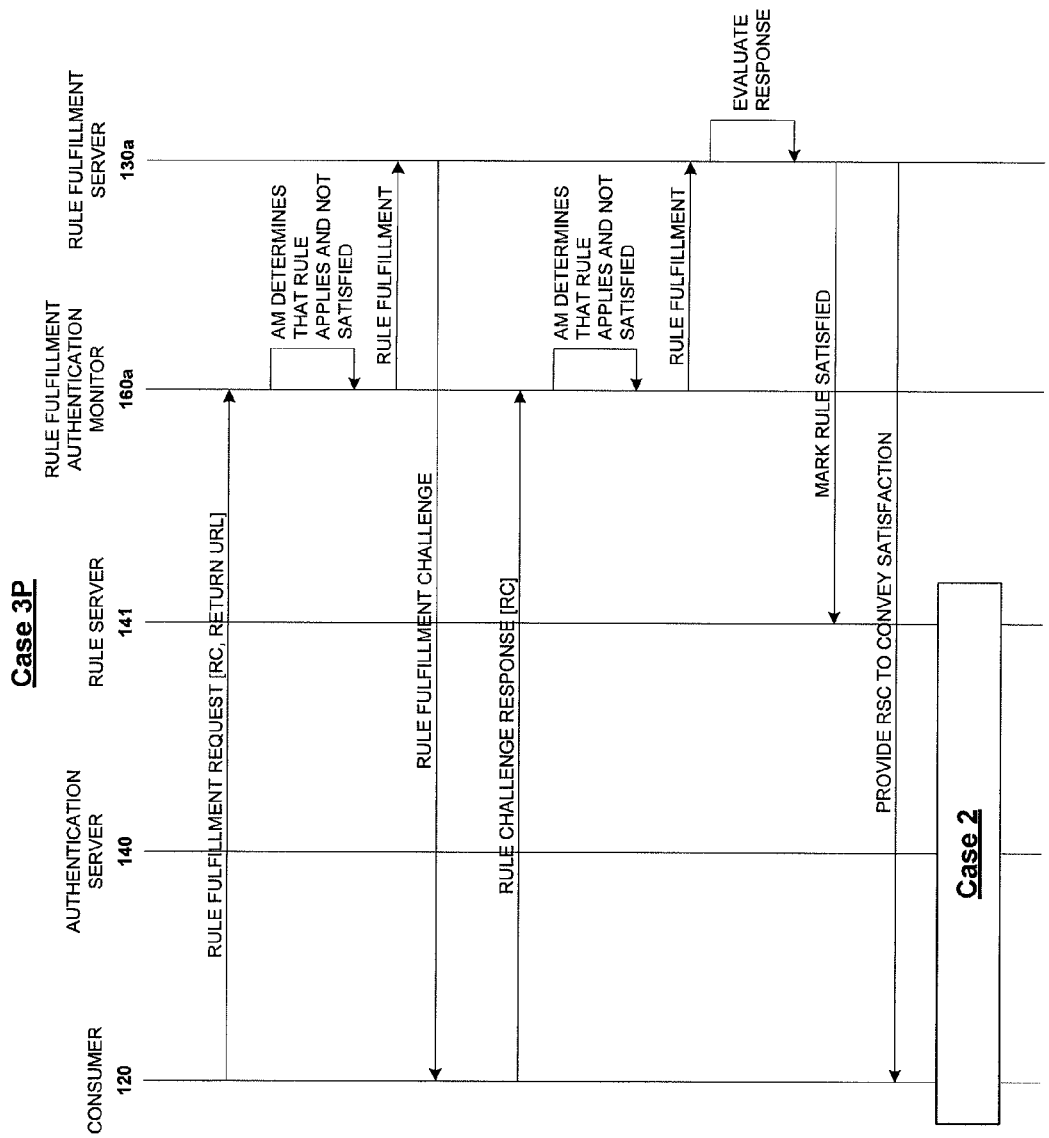

FIG. 8 illustrates a flow diagram depicting the fulfillment of a persistent-type authentication rule. User Case 3P is identical to Use Case 3S except that after the rule fulfillment server 130a determines that an authentication rule has been satisfied, the rule fulfillment server 130a also sends a message to the rules server 141 indicating that the authentication rule has been satisfied. In other embodiments, the rule fulfillment server 130a can send a message to a device manager 145a indicating that the authentication rule has been satisfied (e.g., a device manager responsible for hard tokens can store state data indicating whether a hard token is activated or not).

Use Case 4: Rules Credential Includes One Authentication Rule

Figure 9:
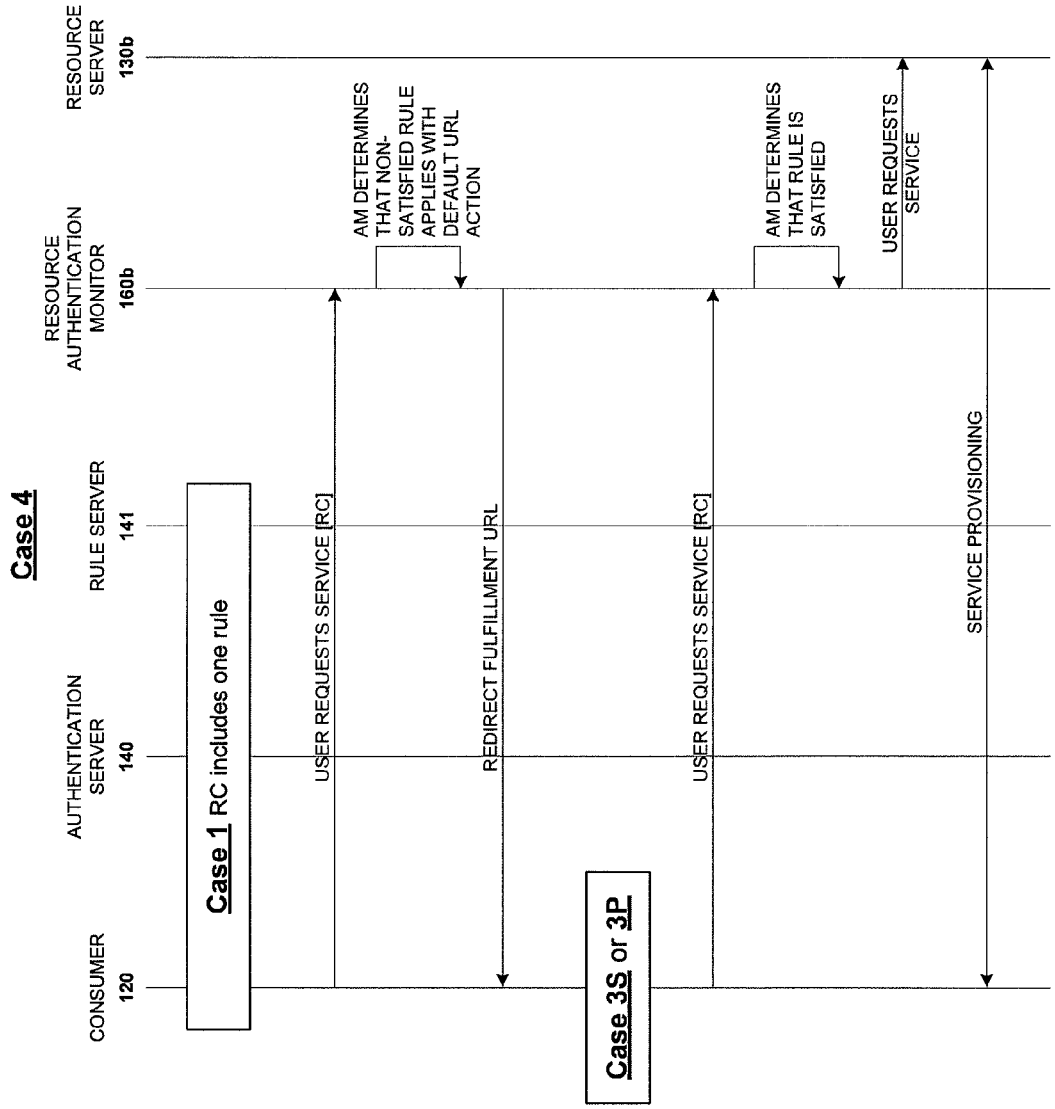

FIG. 9 illustrates a flow diagram depicting the provisioning of a service when the rules credentials includes one authentication rule. The user 120 acquires the rules credential as illustrated in Case 1. The user 120 requests the service from resource server 130b. The request includes the rules credential. The resource authentication monitor 160b determines that the authentication rule included in the rules credential applies and is not satisfied. The resource authentication monitor 160*b* can also determine if any local override action exists. The default rule action redirects the user 120 to a fulfillment server URL. The user 120 fulfills the authentication rule as illustrated in Cases 3S or 3P depending on whether the rule is session-based or persistent-based. The user 120*a* returns to the authentication monitor 160*b*, which determines that the authentication rule applies and is satisfied. The authentication monitor 160*b* admits the request for service to the resource server 130*b* to provision the service.

Use Case 5: Sponsor Mandates a Non-Fulfilling Logging Rule for a User

Figure 10:
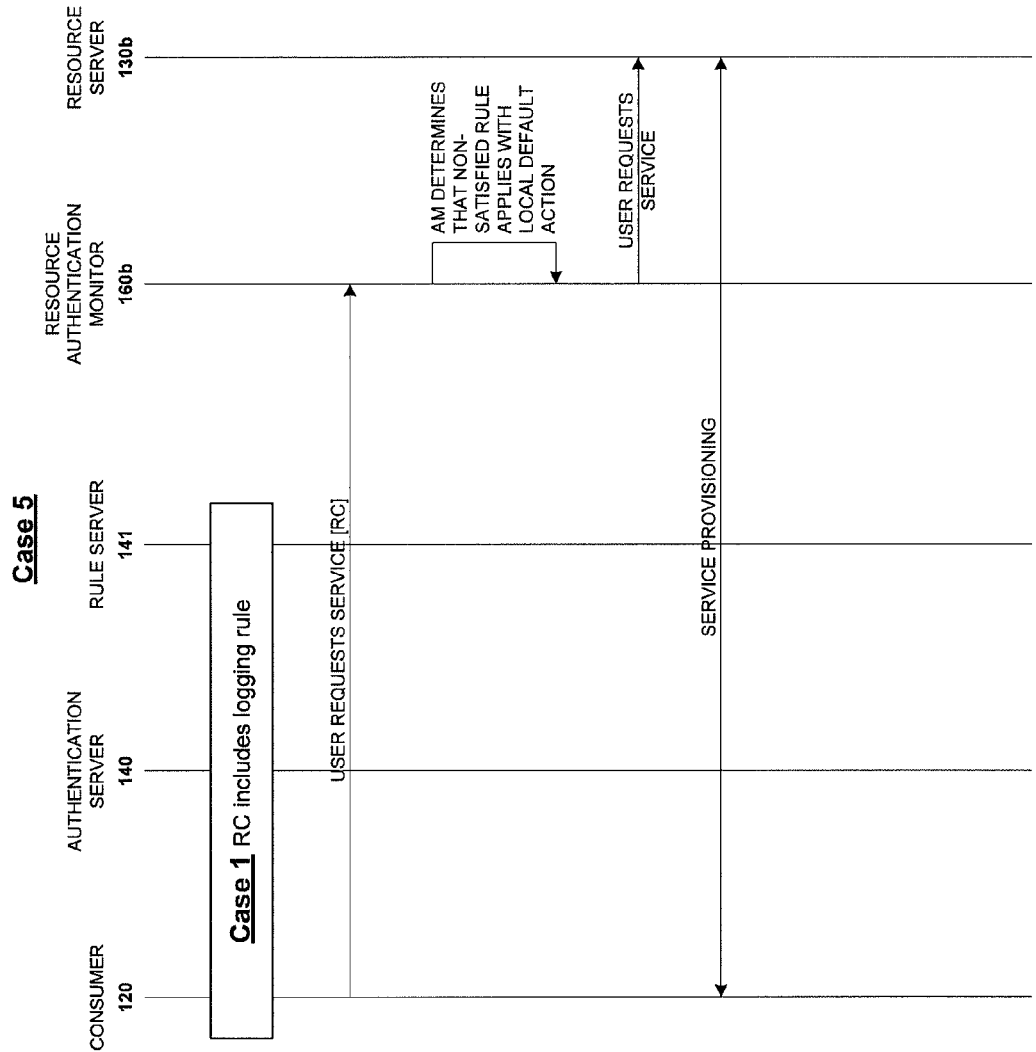
Figure 11:
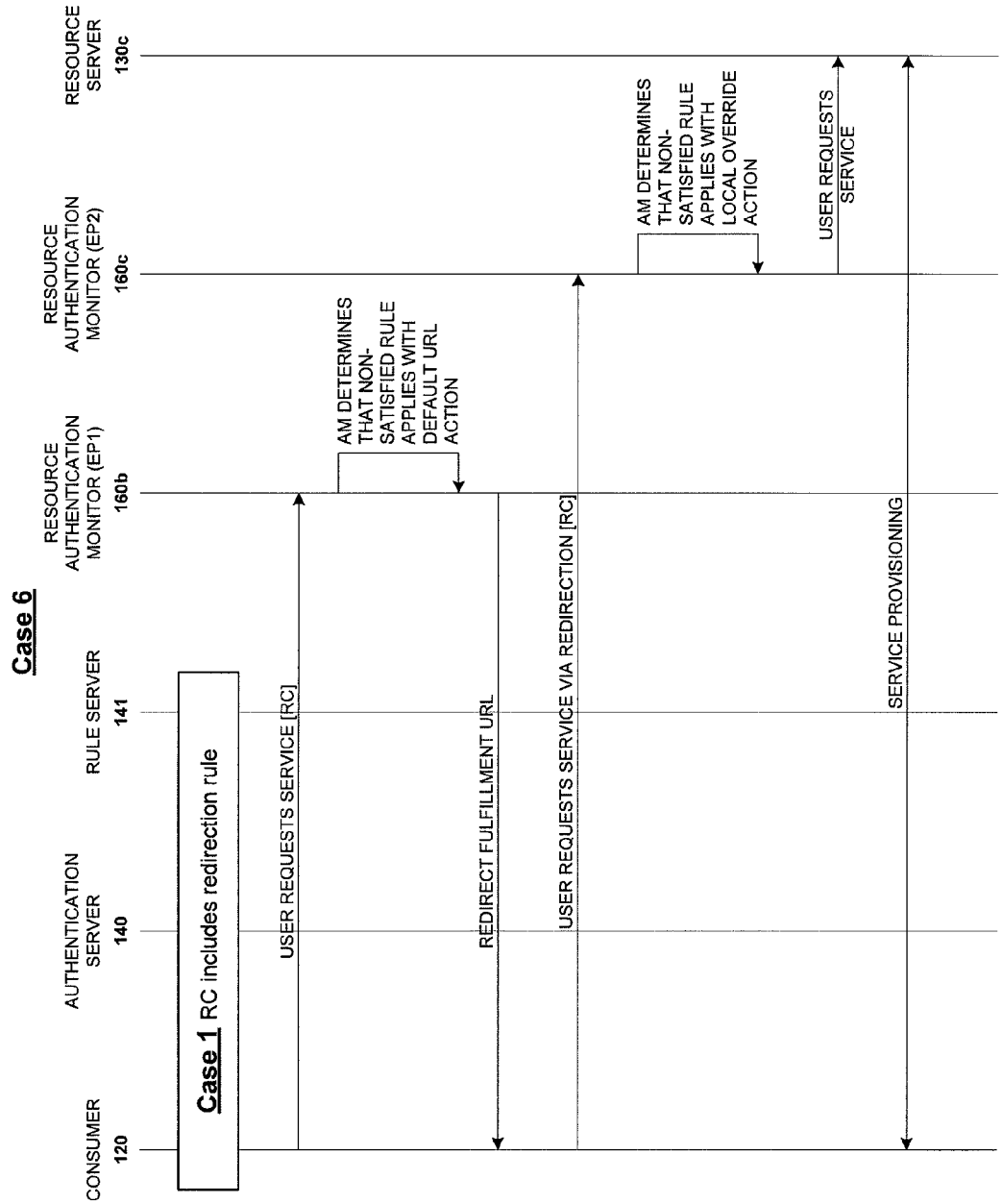

FIG. 10 illustrates a flow diagram depicting a local non-fulfilling logging authentication rule. A sponsoring enterprise (e.g., a service provider) determines, for example, that a particular user 120 (e.g., JohnQAdams) may engage in fraudulent activity. The sponsor creates an authentication rule that requires every enforcement point to log additional information while processing the request. The authentication rule remains unsatisfied after fulfillment and requires the enforcement point 160*b* defending a protected resource 130*b* to log additional data about the request. Table V below illustrates the rule and enforcement contexts and the authentication rule associated with Case 5.

TABLE V

| Use Case 5 |
|---|
| RuleAcquisitionContext |
|    UserID: JohnQAdams |
|    AuthMethod: RetailCust |
|    AuthBusUnit: Retail |
|    Channel |
|      Type: Web |
|      Source: 198.32.62.1 |
|      Agent: IE5.0.2019.7 |
|      UserRole: Customer |
| EnforcementContext |
|    AuthMethod: RetailCust |
|    AuthBusUnit: Retail |
|    Owner: Retail |
|    UserRole: Customer |
|    Time: 9 am |
|    Day: Wednesday |
|    Expiration: None |
|    Channel: Web |
|    ServiceType: PersonalData |
|    LocalOverride(s): None |
|    RuleActionPresence: None |
| Rule Set (in eval order) |
|    Rule 1: Logging |
| Rules Definition: |
| Logging: |
|    TriggerSets(inclusive) |
|      Channel: N/A |
|      UserRole: N/A |
|      BusUnit: N/A |
|      Time: N/A |
|      Day: N/A |
|      Interval: N/A |
|      AuthMethod: N/A |
|      ServiceType: N/A |
|    RuleActionName: FraudLog |
|    RuleType: Info |
|    GroupCode: 0 |
|    PriorityCode: 0 |
|    Satisfaction: NotSatis |
|    DefaultFulAction: FraudLog |
|    OptionalOverride: None |

Use Case 6: Sponsor Mandates a Non-Fulfilling Redirection Rule for a User

FIG. 1 illustrates a flow diagram depicting a non-fulfilling redirection authentication rule. A sponsoring enterprise (e.g., a service provider) determines, for example, that a particular user 120 (e.g., JohnQAdams) may engage in fraudulent activity. The sponsor creates an authentication rule that is enforced at all enforcement points (e.g., 160*b*) to defend a protected service by redirecting the user 120 to a different location 160*c*. The authentication rule remains unsatisfied after fulfillment. The policy of the enforcement point defending the second enforcement point 160*c* (EP2) overrides the default action and permits the request to enter. Table VI below illustrates the rule and enforcement contexts and the authentication rule associated with Case 6.

TABLE VI

| Use Case 6 |
|---|
| RuleAcquisitionContext |
|    UserID: JohnQAdams |
|    AuthMethod: RetailCust |
|    AuthBusUnit: Retail |
|    Channel |
|      Type: Web |
|      Source: 127.0.0.1 |
|      Agent: IE6.0.2019.7 |
|      UserRole: Customer |
| EnforcementContext: EP1 |
|    AuthMethod: RetailCust |
|    AuthBusUnit: Retail |
|    Owner: Wholesale |
|    UserRole: Customer |
|    Time: 9 am |
|    Day: Wednesday |
|    Expiration: None |
|    Channel: Web |
|    ServiceType: PersonalData |
|    LocalOverride(s): None |
|    RuleActionPresence: None |
| EnforcementContext: EP2 |
|    AuthMethod: RetailCust |
|    AuthBusUnit: Retail |
|    Owner: Wholesale |
|    UserRole: Customer |
|    Time: 9:01 am |
|    Day: Wednesday |
|    Expiration: None |
|    Channel: Web |
|    ServiceType: PersonalData |
|    LocalOverride: |
|      RestrictSite: |
|         admit if unsat |
|    RuleAction: RestrictSite |
| Rule Set (in eval order) |
|    Rule 1: Redirection |
| Rules Definition: |
| Redirection: |
|    TriggerSets(inclusive) |
|      Channel: N/A |
|      UserRole: N/A |
|      BusUnit: N/A |
|      Time: N/A |
|      Day: N/A |
|      Interval: N/A |
|      AuthMethod: N/A |
|      ServiceType: N/A |
|    RuleActionName: Restrict |
|    RuleType: NavRestrict |
|    GroupCode: 0 |
|    PriorityCode: 0 |
|    Satisfaction: NotSatis |
|    DefaultFulAction: Redirect |
|    FulfillmentLoc: AltURL |
|    OptionalOverride: None |

Use Case 7: Sponsor Mandates a Global Hard Token Rule

Figure 12:
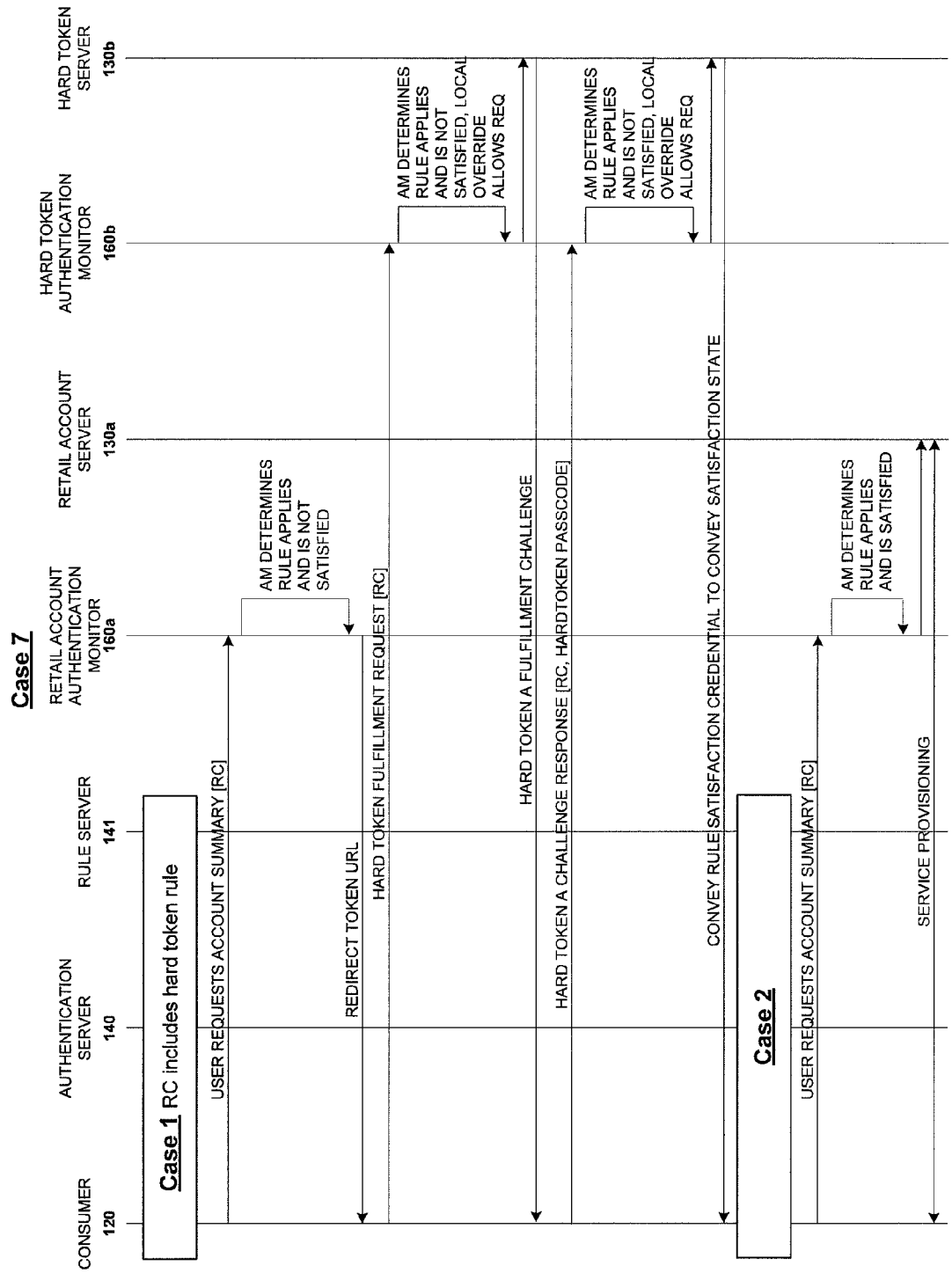

FIG. 12 illustrates a flow diagram depicting service provisioning using a global hard token rule. A sponsor creates a mandatory hard token authentication rule for all users of the sponsor, including user 120. The authentication rule applies when any user accesses any service (e.g., retail account summary at server 130*a*). The user 120 must satisfy the authentication rule once in a session. If the authentication rule is not satisfied, the authentication rule requires the user 120 to provide a hard token generated one-time PIN when the user visits the protected resource 130*a*. If the user 120 correctly inputs the appropriate passcode at token server 130*b*, then the user's rules credential can be updated, as illustrated in Case 2, to mark the hard token rule satisfied. The user 120 can then access the requested service at server 130*a*. Table VII below illustrates the rule and enforcement contexts and the authentication rule associated with Case 7.

TABLE VII

Use Case 7

```
RuleAcquisitionContext
    UserID: JohnQAdams
    AuthMethod: RetailCust
    AuthBusUnit: Retail
    Channel
        Type: Web
        Source: 127.0.0.1
        Agent: IE6.0.2019.7
        UserRole: Customer
EnforcementContext
    AuthMethod: RetailCust
    AuthBusUnit: Retail
    Owner: Wholesale
    UserRole: Customer
    Time: 9 am
    Day: Wednesday
    Expiration: None
    Channel: Web
    ServiceType: PersonalData
    LocalOverride(s): None
    RuleActionPresence: None
Rule Set (in eval order)
    Rule 1: HardToken
Rules Definition:
HardToken:
    TriggerSets(inclusive)
        Channel: N/A
        UserRole: N/A
        BusUnit: N/A
        Time: N/A
        Day: N/A
        Interval: N/A
        AuthMethod: N/A
        ServiceType: N/A
    RuleActionName: HTokenAct
    RuleType: Session
    GroupCode: 0
    PriorityCode: 1
    Satisfaction: NotSatis
    DefaultFulAction: Redirect
    FulfillmentLoc: HTokenURL
    OptionalOverride: None
```

Use Case 8: Sponsor Offers Users Option to Use a Global Hard Token Rule

Figure 13:
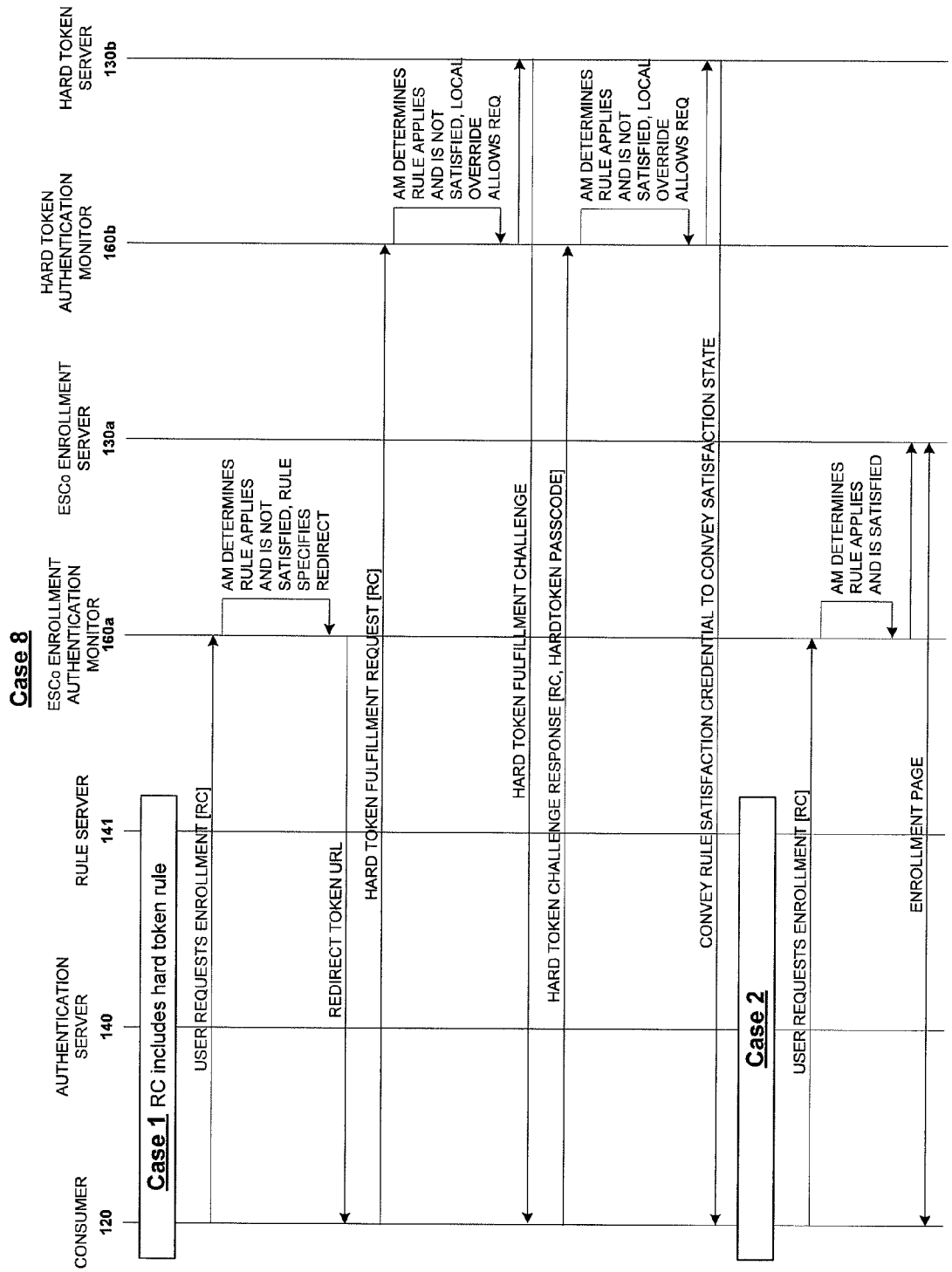

FIG. 13 illustrates a flow diagram depicting service provisioning using an optional global hard token rule. A sponsor creates an optional hard token authentication rule for all users that enroll with the sponsor, including user 120, who has activated their hard token. The authentication rule applies when any user accesses any service (e.g., Employee Services Company (ESCo) Enrollment Server 130*a*). The user 120 must satisfy the authentication rule once in a session. If the authentication rule is not satisfied, the authentication rule requires the user 120 to fulfill the authentication rule at hard token server 130*b*. The hard token authentication monitor 160*b* determines that the rule applies and is not satisfied. However, the hard token authentication monitor 160*b* includes an override in this case and provides access to the hard token server 130*b*, which challenges the user 120 to provide a hard token generated one-time PIN. If the user 120 correctly inputs the appropriate passcode at token server 130*b*, then the user's rules credential can be updated, as illustrated in Case 2, to mark the hard token rule satisfied. The user 120 can then access the requested enrollment service at Employee Services Company server 130*a*. Table VIII below illustrates the rule and enforcement contexts and the authentication rule associated with Case 8.

TABLE VIII

Use Case 8

```
RuleAcquisitionContext
    UserID: JohnQAdams
    AuthMethod: NBCust
    AuthBusUnit: ESCo
    Channel
        Type: Web
        Source: 127.0.0.1
        Agent: IE6.0.2019.7
        UserRole: Customer
EnforcementContext
    AuthMethod: NBCust
    AuthBusUnit: ESCo
    Owner: ESCo
    UserRole: Customer
    Time: 9 am
    Day: Wednesday
    Expiration: None
    Channel: Web
    ServiceType: PersonalData
    LocalOverride(s): None
    RuleActionPresence: None
Rule Set (in eval order)
    Rule 1: HardToken
Rules Definition:
HardToken:
    TriggerSets(inclusive)
        Channel: N/A
        UserRole: N/A
        BusUnit: N/A
        Time: N/A
        Day: N/A
        Interval: N/A
        AuthMethod: N/A
        ServiceType: N/A
    RuleActionName: HTokenAct
    RuleType: Session
    GroupCode: 0
    PriorityCode: 1
    Satisfaction: NotSatis
    DefaultFulAction: Redirect
    FulfillmentLoc: HTokenURL
    OptionalOverride: None
```

Use Case 9: Sponsor Mandates a User-Configurable Global Hard Token Rule

Figure 14:
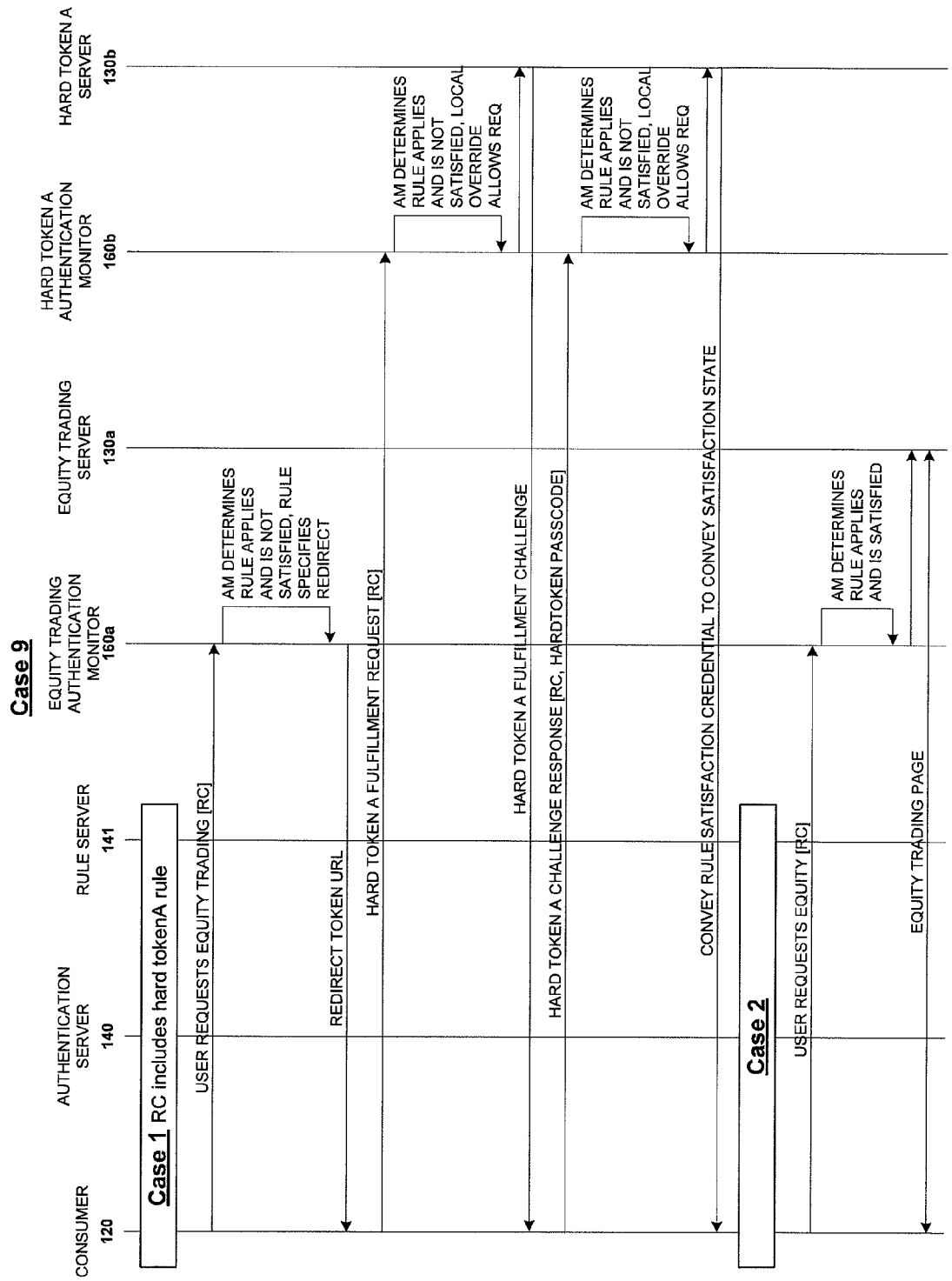

FIG. 14 illustrates a flow diagram depicting service provisioning using an user-configurable global hard token rule. A sponsor can create one or more hard token authentication rules to be used with different hard token vendors (e.g., RSA, Verisign, etc.). The sponsor can allow users enrolled for hard tokens to select what type of hard token to use. User 120 has selected hard token A and has activated their hard token such that the payload instruction in the authentication rule directs the user to hard token A server 130*b*. In this case, the authentication rule is mandated by the sponsor, however the sponsor can also make the rule optional to the user 120. Table IX below illustrates the rule and enforcement contexts and the authentication rule associated with Case 9.

TABLE IX

Use Case 9

```
RuleAcquisitionContext
    UserID: JohnQAdams
    AuthMethod: RetailCust
    AuthBusUnit: Retail
    Channel
        Type: Web
        Source: 127.0.0.1
        Agent: IE6.0.2019.7
        UserRole: Customer
EnforcementContext
    AuthMethod: RetailCust
    AuthBusUnit: Retail
    Owner: Retail
    UserRole: Customer
    Time: 9 am
    Day: Wednesday
    Expiration: None
    Channel: Web
    ServiceType: PersonalData
    LocalOverride(s): None
    RuleActionPresence: None
Rule Set (in eval order)
    Rule 1: HardTokenA
Rules Definition:
HardTokenA:
    TriggerSets(inclusive)
        Channel: N/A
        UserRole: N/A
        BusUnit: N/A
        Time: N/A
        Day: N/A
        Interval: N/A
        AuthMethod: N/A
        ServiceType: N/A
    RuleActionName: HTokenAAct
    RuleType: Session
    GroupCode: 0
    PriorityCode: 1
    Satisfaction: NotSatis
    DefaultFulAction: Redirect
    FulfillmentLoc: HTokA URL
    OptionalOverride: None
```

Use Case 10a: Sponsor Group Mandates a Hard Token Rule

Figure 15:
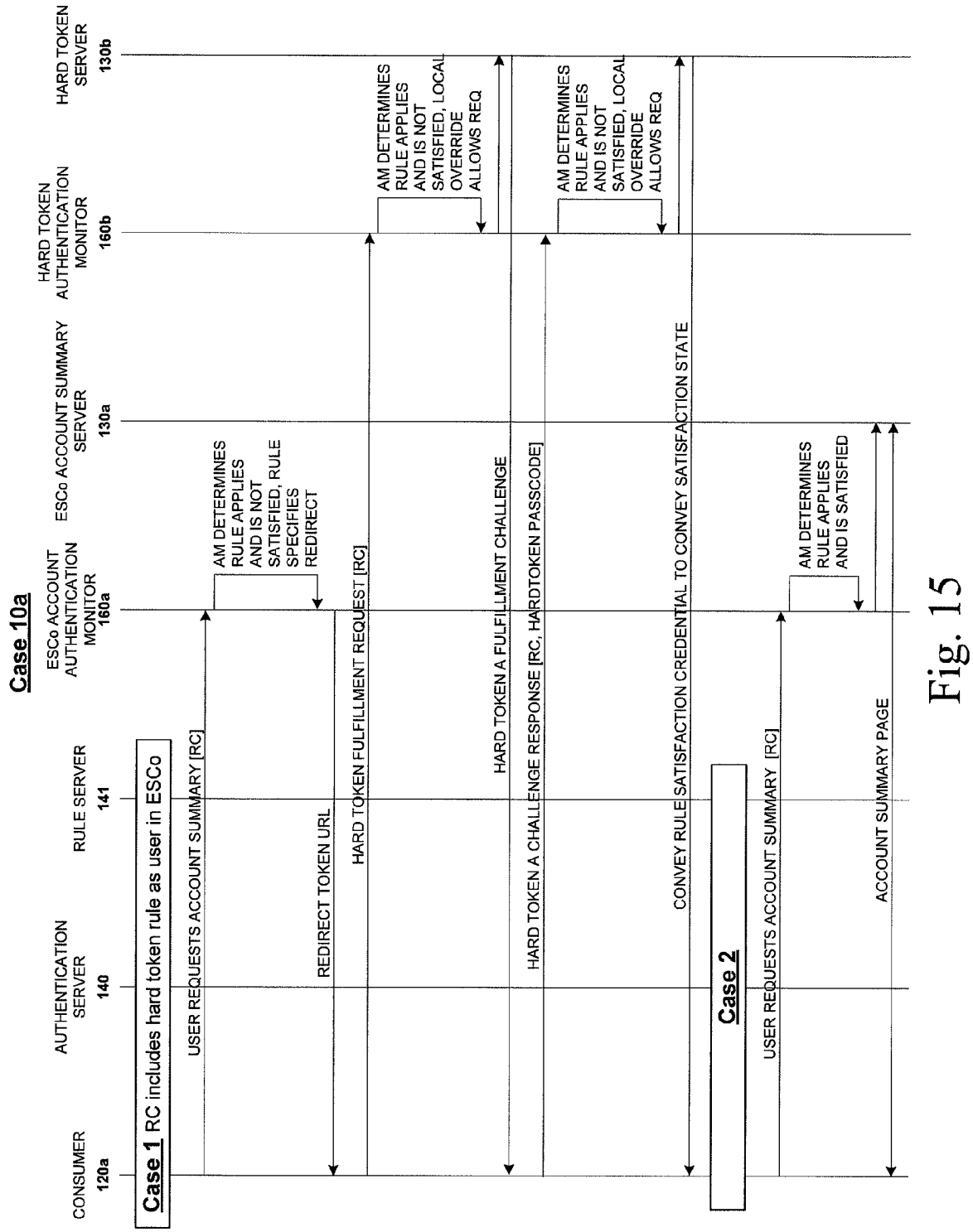

FIG. 15 illustrates a flow diagram depicting service provisioning using a group mandated hard token rule. A group of a sponsor (e.g., a client company of an employee services company) creates a mandatory hard token rule for all employees, including user 120*a*, of the client company. The authentication rule applies whenever the users enter via the group's unit authentication method or when the users visit a protected resource of the group. The user 120*a* must satisfy the authentication rule only once in an authentication session. The group of the sponsor, or the sponsor, provides a list of the employees and the sponsor can create this authentication rule for each of the employees. Table X below illustrates the rule and enforcement contexts and the authentication rule associated with Case 10.

TABLE X

Use Case 10

```
RuleAcquisitionContext
    UserID: JohnQAdams
    AuthMethod: NBPart
    AuthBusUnit: ESCo
    Channel
        Type: Web
        Source: 127.0.0.1
```

TABLE X-continued

Use Case 10

```
        Agent: IE6.0.2019.7
        UserRole: Customer
EnforcementContext
    AuthMethod: NBPart
    AuthBusUnit: ESCo
    Owner: ESCo
    UserRole: Customer
    Time: 9 am
    Day: Wednesday
    Expiration: None
    Channel: Web
    ServiceType: PersonalData
    LocalOverride(s): None
    RuleActionPresence: None
Rule Set (in eval order)
    Rule 1: HardToken
Rules Definition:
HardToken:
    TriggerSets(inclusive)
        Channel: N/A
        UserRole: N/A
        BusUnit: ESCo
        Time: N/A
        Day: N/A
        Interval: N/A
        AuthMethod: N/A
        ServiceType: N/A
    RuleActionName: HTokenAct
    RuleType: Session
    GroupCode: 0
    PriorityCode: 1
    Satisfaction: NotSatis
    DefaultFulAction: Redirect
    FulfillmentLoc: HTokenURL
    OptionalOverride: None
```

Use Case 10b: Sponsor Group Mandates a Hard Token Rule

Figure 16:
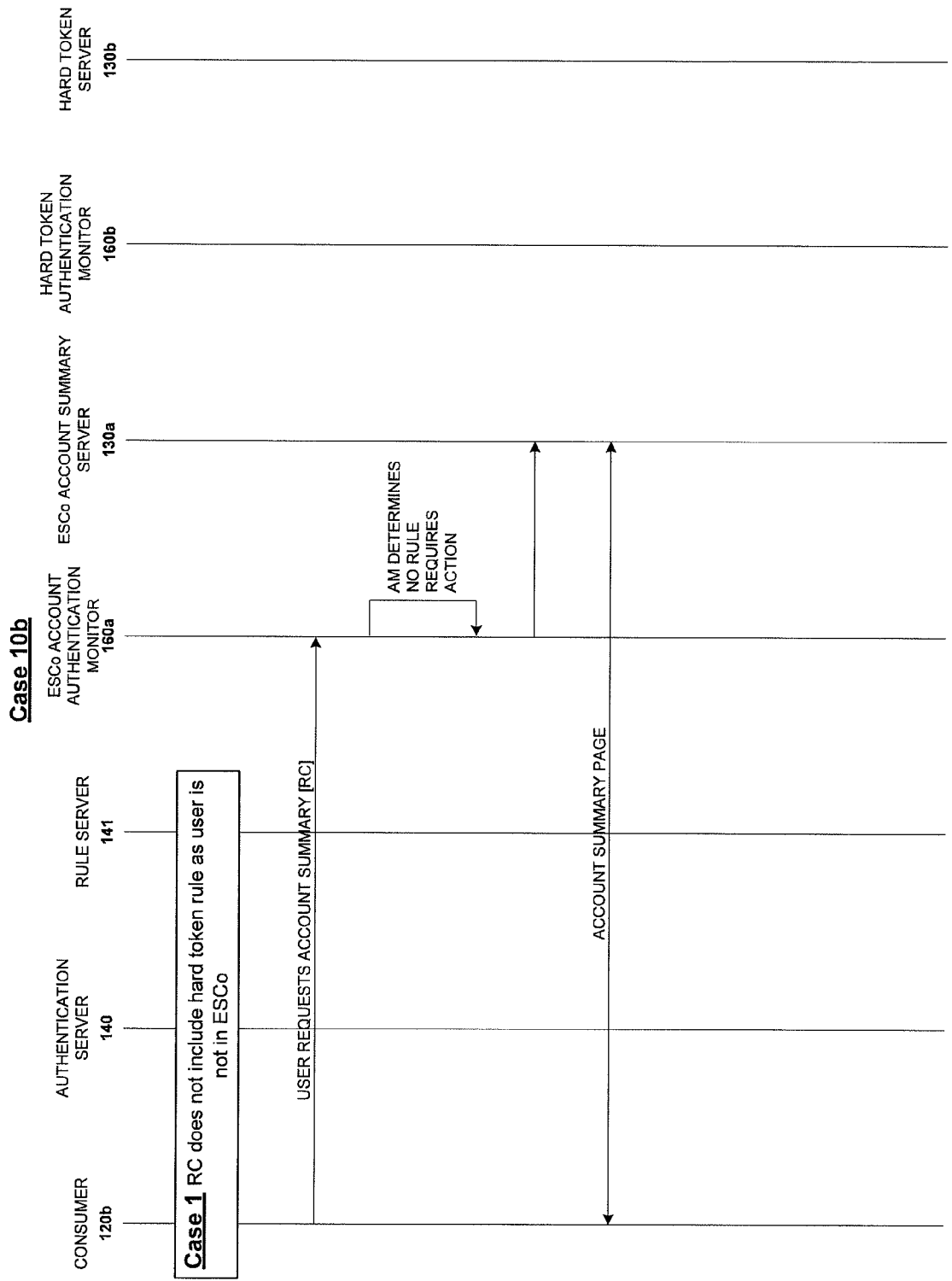

FIG. 16 illustrates a flow diagram depicting service provisioning using the group mandated hard token rule of Use Case 10a. However, the user 120*b* is not an employee of the Employee Services Company (ESCo). In this case, the rules credential does not include the authentication rule from Use Case 10a. Therefore, the ESCo Account authentication monitor 160*a* allows the user 120 to access the ESCo Account server 130*a*.

Use Case 11: Sponsor Group Offers an Optional Hard Token Rule

Figure 17:
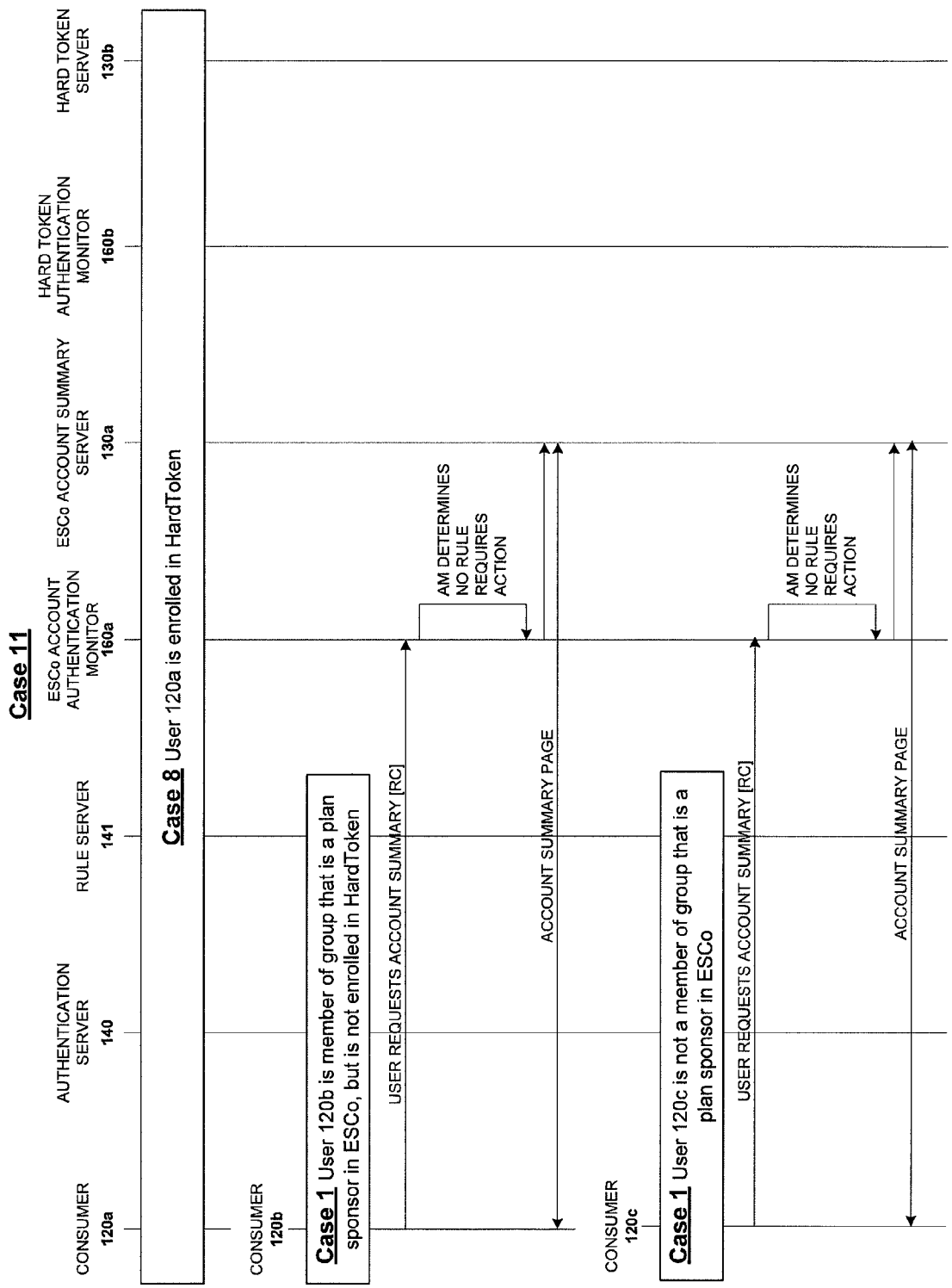

FIG. 17 illustrates a flow diagram depicting service provisioning using a group-sponsored optional hard token rule. A group of a sponsor (e.g., a client company of an employee services company) creates an optional hard token rule for all employees, including users 120*a* and 120*b*, of the client company. User 120*a* is enrolled in the hard token, and service provisioning follows the flow diagram illustrated in Case 8. User 120*b*, while an employee in a group that is a plan sponsor in Employee Services Company (ESCo), is not enrolled in the hard token. Therefore, the rules credential for user 120*b* does not include the hard token authentication rule and the ESCo Account authentication monitor 160*a* allows the user 120*b* to access the ESCo server 130*a*. Likewise, for a user 120*c* that is not a member of a group sponsor in ESCo, their rules credential will not include a hard token authentication rule. Table XI below illustrates the rule and enforcement contexts and the authentication rule associated with Case 11.

TABLE XI

Use Case 11

```
RuleAcquisitionContext
    UserID: JohnQAdams
    AuthMethod: NBPart
    AuthBusUnit: ESCo
    Channel
        Type: Web
        Source: 127.0.0.1
        Agent: IE6.0.2019.7
        UserRole: Customer
EnforcementContext
    AuthMethod: NBPart
    AuthBusUnit: ESCo
    Owner: ESCo
    UserRole: Customer
    Time: 9 am
    Day: Wednesday
    Expiration: None
    Channel: Web
    ServiceType: PersonalData
    LocalOverride(s): None
    RuleActionPresence: None
Rule Set (in eval order)
    Rule 1: HardToken
Rules Definition:
HardToken:
    TriggerSets(inclusive)
        Channel: N/A
        UserRole: N/A
        BusUnit: ESCo
        Time: N/A
        Day: N/A
        Interval: N/A
        AuthMethod: N/A
        ServiceType: N/A
    RuleActionName: HTokenAct
    RuleType: Session
    GroupCode: 0
    PriorityCode: 1
    Satisfaction: NotSatis
    DefaultFulAction: Redirect
    FulfillmentLoc: HTokenURL
    OptionalOverride: None
```

Use Case 12: User has Multiple Rule Types

Figure 18A:
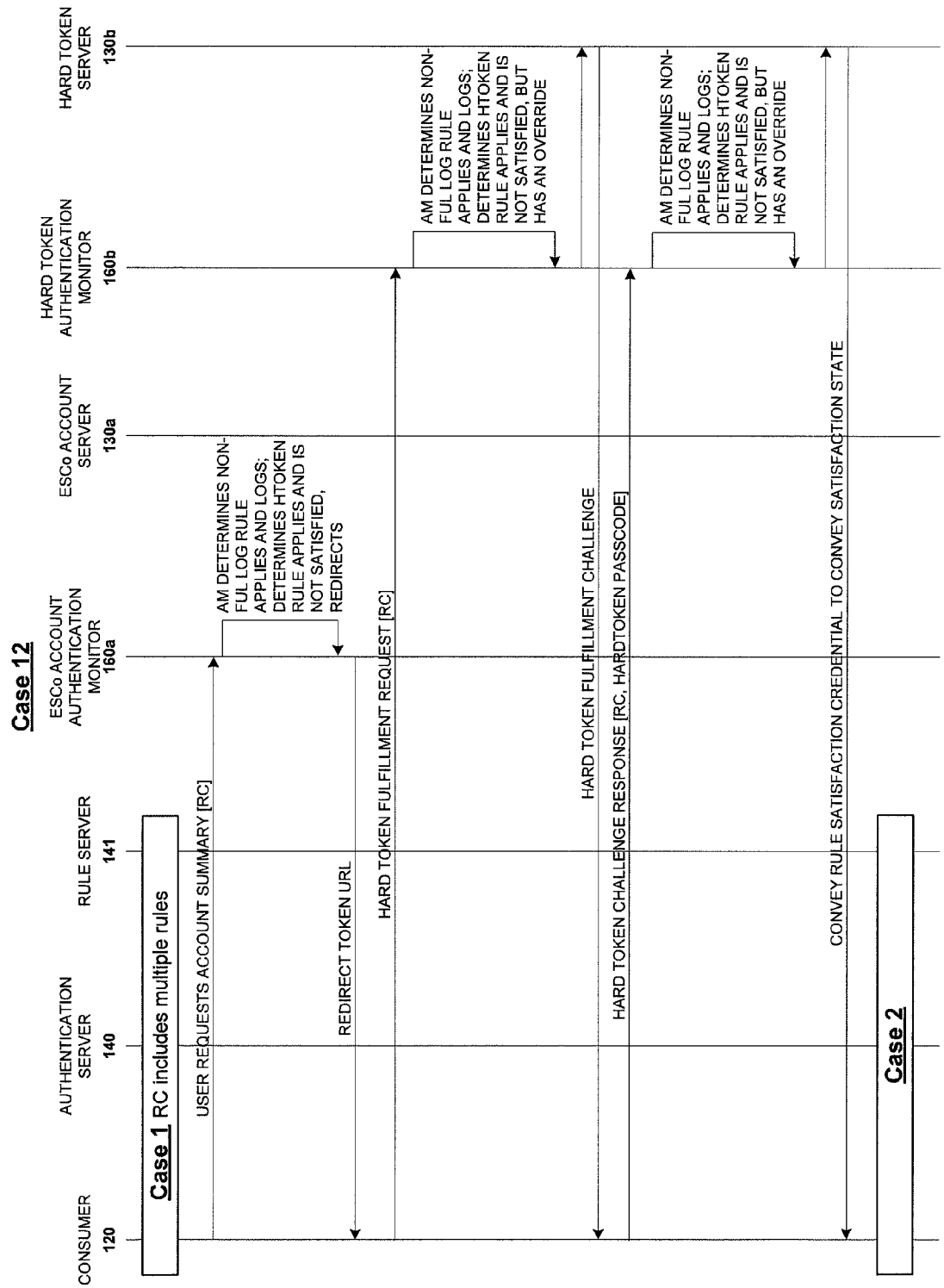
Figure 18B:
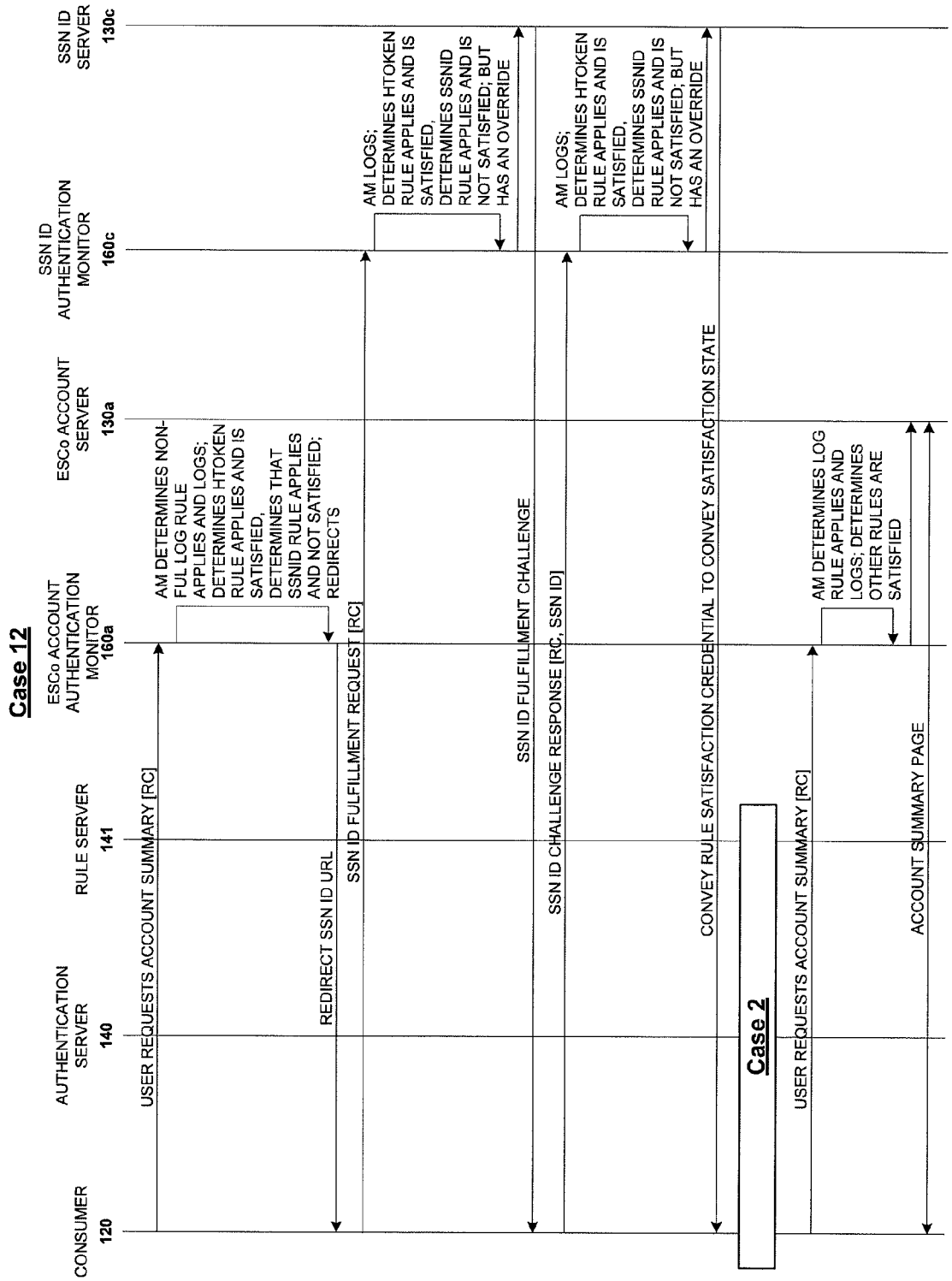

FIGS. 18A-B illustrate a flow diagram depicting service provisioning when a user has three authentication rules: logging, hard token, and forced ACI. The rules are ordered in the rules credential such that the logging rule is evaluated first at each enforcement point, followed by evaluation of the hard token rule, and then evaluation of the forced ACI rule. The user 120 requests an account summary service from ESCo Account server 130*a*. The ESCo authentication monitor 160*a* determines that the logging rule applies and logs information about the session. Next, the ESCo authentication monitor 160*a* determines that a hard token rule applies and is not satisfied. The user 120 is redirected to fulfill the hard token authentication rule. The hard token authentication monitor 160*b* also determines that the logging rule applies and logs information on the session. Next, the hard token authentication monitor 160*b* determines that the hard token authentication rule applies and is not satisfied. However, since the hard token authentication monitor 160*b* protects the server 130*b* that is associated with fulfillment of the hard token authentication rule, an override exists that allows the user 120 to access the hard token server 130*b*.

As illustrated in FIG. 18B, the user 120 returns to the ESCo authentication monitor 160*a*, which still determines that the logging rule applies and logs information about the session. The ESCo authentication monitor 160*a* now, however, determines that the hard token rule is satisfied and evaluates the next authentication rule in the rules credential. The forced ACI authentication rule is a persistent rule that forces the user 120 to change their ID if their current ID is set to be their social security number (SSN). The user 120 is redirected to change their ID (i.e., fulfill the forced ACI authentication rule). The SSN ID authentication monitor 160*c* determines that the logging rule applies and logs information on the session, and that the hard token rule applies but is satisfied. Next, the SSN ID authentication monitor 160*c* determines that the forced ACI authentication rule applies, is not satisfied, but that an override exists for the rule to allow access to the SSN ID server 130*c*. The user 120 is challenged to change their ID and the forced ACI rule is satisfied if the ID is not the user 120's SSN. The user 120 is subsequently allowed to access their account summary at server 130*a*. Table XII below illustrates the rule and enforcement contexts and the authentication rule associated with Case 12.

TABLE XII

Use Case 12

```
RuleAcquisitionContext
    UserID: GeneralUser
    AuthMethod: NBPlanAdmin
    AuthBusUnit: ESCo
    Channel
        Type: Any
        Source: 127.0.0.1
        Agent: IE6.0.2019.7
        UserRole: Admin
EnforcementContext
    AuthMethod: NBPlanAdmin
    AuthBusUnit: ESCo
    Owner: ESCo
    UserRole: Admin
    Time: 11 am
    Day: Thursday
    Expiration: None
    Channel: Any
    ServiceType: Any
    LocalOverride(s): None
    RuleActionPresence: None
Rule Set (in eval order)
    Rule 1: Logging
    Rule 2: HardToken
    Rule 3: ForcedACI
Rules Definition:
    Logging: (see Table XIX)
    HardToken: (see Table XI)
    ForcedACI: (see Table XV)
```

Figure 19A:
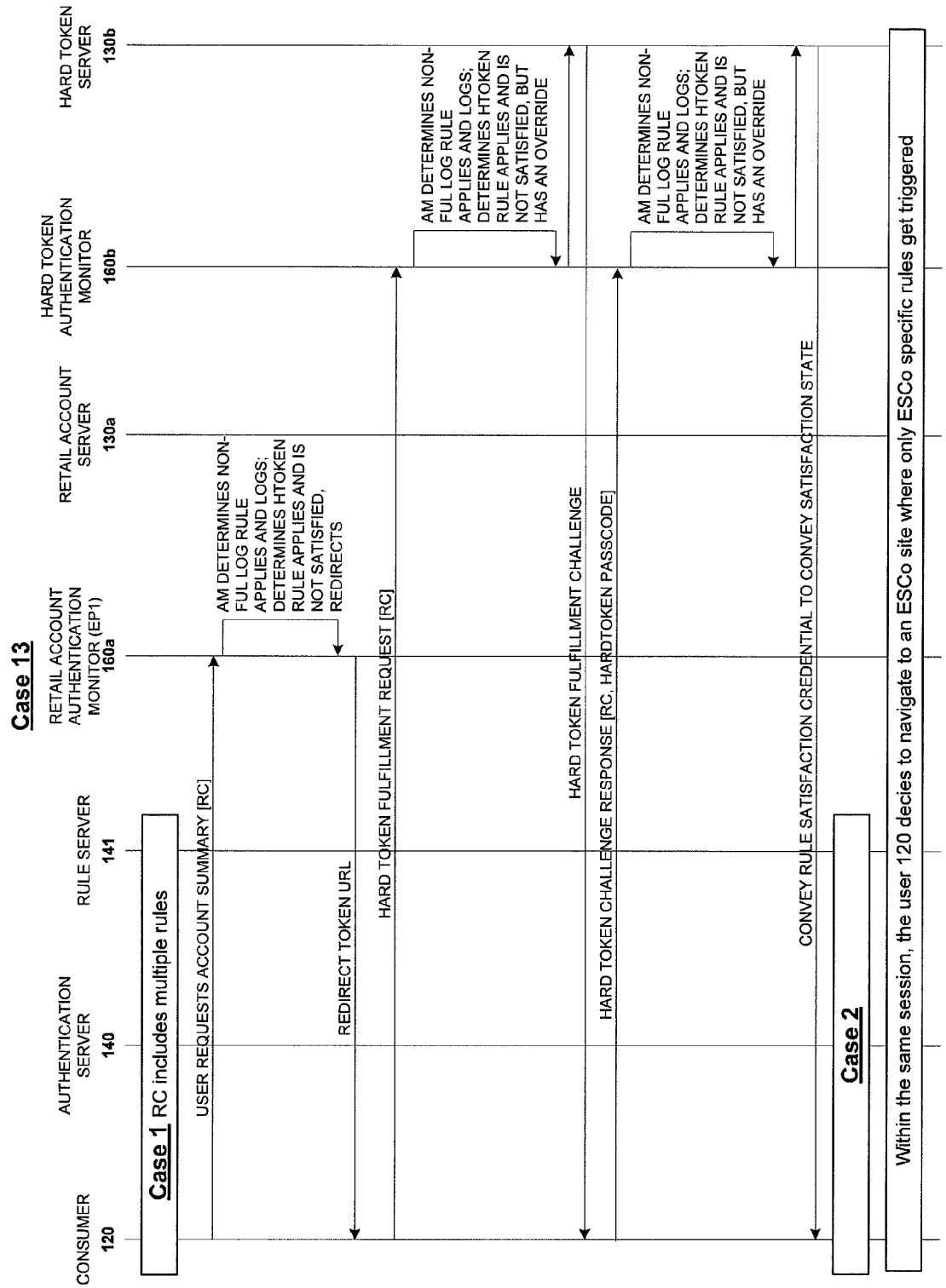
Figure 19B:
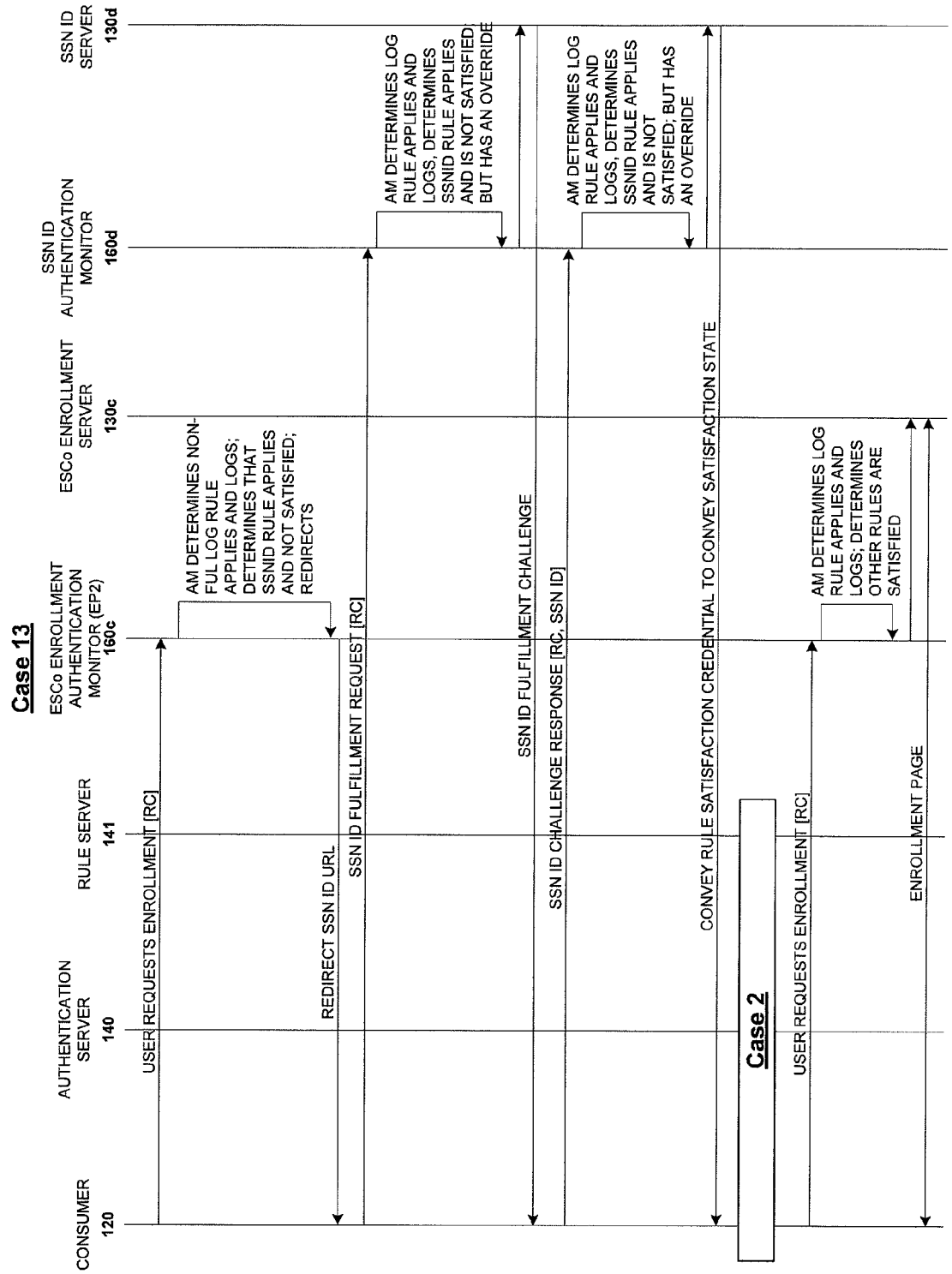

Use Case 13: User has Multiple Rule Types Triggering in Different Business Units FIGS. 19A-B illustrates a flow diagram depicting service provisioning when a user has multiple rule types triggering in different business units. For various reasons, a user that is both a normal customer and also an employee of a client organization can have acquired a set of rules that comprise: a non-fulfilling logging rule (due to suspicious browser characteristics that triggers in Retail and ESCo), a hard token rule (due to customer opt-in that triggers only in Retail), and a non-SSN ID (forced ACI) rule (due to client organization mandate that triggers only in ESCo). FIGS. 19A-B illustrate how the rules are triggered and enforced for Use Case 13 as the user 120 navigates the network 100. Table XIII below illustrates the rule and enforcement contexts and the authentication rule associated with Case 13.

TABLE XIII

| Use Case 13 |
|---|
| RuleAcquisitionContext |
|   UserID: GeneralUser |
|   AuthMethod: RetailCust |
|   AuthBusUnit: Retail |
|   Channel |
|     Type: Any |
|     Source: 127.0.0.1 |
|     Agent: IE6.0.2019.7 |
|     UserRole: Customer |
| EnforcementContext: EP1 |
|   AuthMethod: RetailCust |
|   AuthBusUnit: Retail |
|   Owner: Retail |
|   UserRole: Customer |
|   Time: 11 am |
|   Day: Thursday |
|   Expiration: None |
|   Channel: Any |
|   ServiceType: Any |
|   LocalOverride(s): None |
|   RuleActionPresence: None |
| Rule Set (in eval order) |
|   Rule 1: Logging |
|   Rule 2: HardToken |
|   Rule 3: ForcedACI |
| Rules Definition: |
|   Logging: (see Table XIX) |
|   HardToken: (see Table XI) |
|   ForcedACI: (see Table XV) |
| EnforcementContext: EP2 |
|   AuthMethod: RetailCust |
|   AuthBusUnit: Retail |
|   Owner: ESCo |
|   UserRole: Customer |
|   Time: 11:05 am |
|   Day: Thursday |
|   Expiration: None |
|   Channel: Any |
|   ServiceType: Any |
|   LocalOverride(s): None |
|   RuleActionPresence: None |

Figure 20:
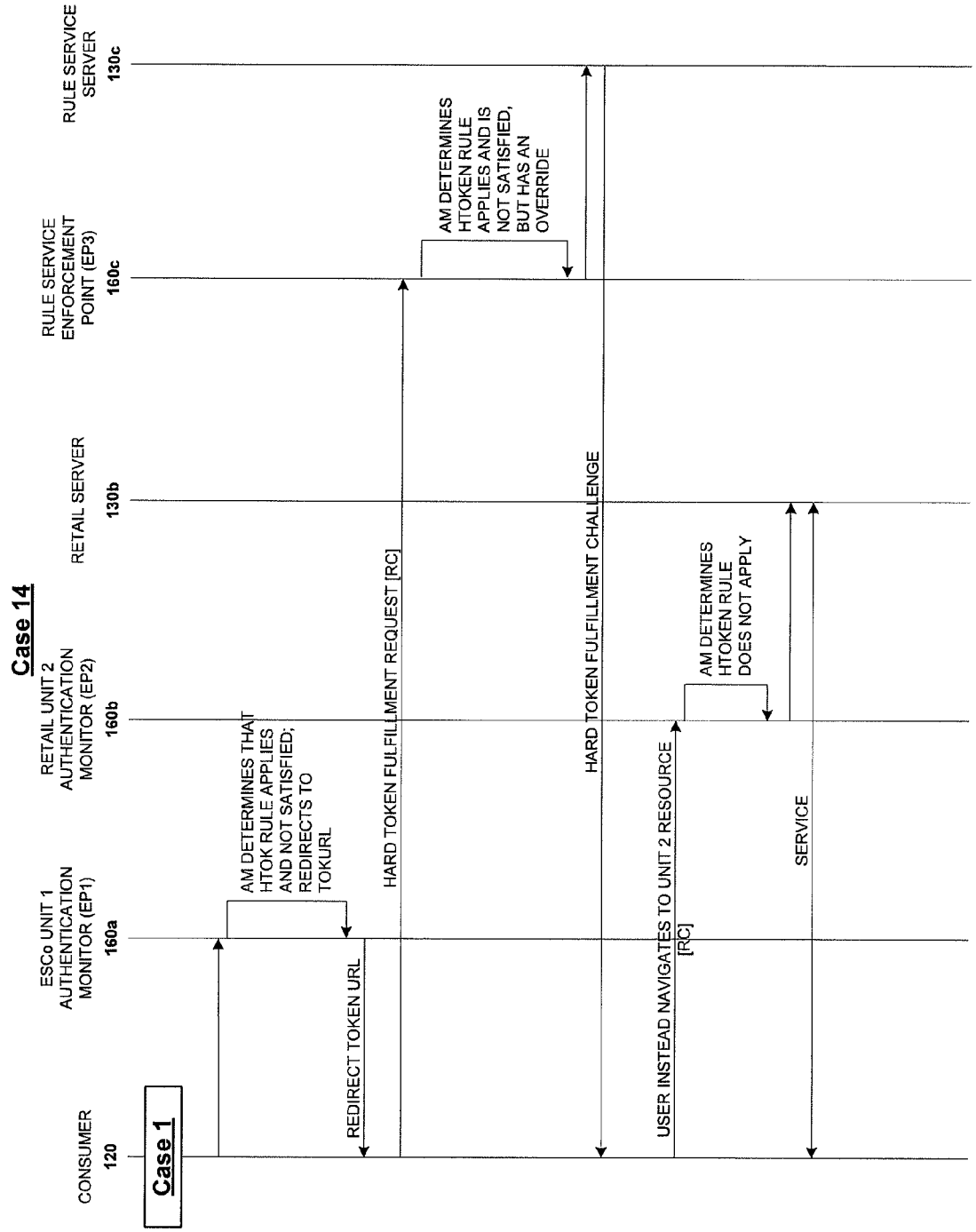

Use Case 14: Hard Token User is Challenged, Navigates Away to Non-Protected Site FIG. 20 illustrates a flow diagram depicting service provisioning when a user is challenged for a hard token and navigates away to a non-protected site. A client organization of an enterprise business unit (e.g. a client of ESCo Services) requires their employees to use a hard token to enter the Enterprise Business Unit. When such a user attempts to visit any protected resource of the Business Unit, and the rule is not satisfied, the rule challenges the user to provide a hard token generated one-time PIN. In this example, the user 120 declines to enter a token value and navigates away to another Enterprise Business Unit at which they have a relationship and at which the hard token rule does not apply. They are allowed entry to the other Enterprise Business Unit. FIG. 20 illustrates how the rules are triggered and enforced for Use Case 14 as the user 120 navigates the network 100. Table XIV below illustrates the rule and enforcement contexts and the authentication rule associated with Case 14.

TABLE XIV

| Use Case 14 |
|---|
| RuleAcquisitionContext |
|   UserID: JohnQAdams |
|   AuthMethod: RetailCust |
|   AuthBusUnit: Retail |

TABLE XIV-continued

| Use Case 14 |
|---|
|   Channel |
|     Type: Web |
|     Source: 127.0.0.1 |
|     Agent: IE6.0.2019.7 |
|     UserRole: Customer |
| EnforcementContext: EP1 |
|   AuthMethod: RetailCust |
|   AuthBusUnit: Retail |
|   Owner: ESCo |
|   UserRole: Customer |
|   Time: 9 am |
|   Day: Wednesday |
|   Expiration: None |
|   Channel: Web |
|   ServiceType: PersonalData |
|   LocalOverride(s): None |
|   RuleActionPresence: None |
| EnforcementContext: EP3 |
|   AuthMethod: RetailCust |
|   AuthBusUnit: Retail |
|   Owner: ESCo |
|   UserRole: Customer |
|   Time: 9m |
|   Day: Wednesday |
|   Expiration: None |
|   Channel: Web |
|   ServiceType: Challenge |
|   LocalOverride(s): Allow |
|   RuleActionPresence: None |
| Rule Set (in eval order) |
|   Rule 1: HardToken |
| Rules Definition: |
|   HardToken: (see Table XI) |
| EnforcementContext: EP2 |
|   AuthMethod: RetailCust |
|   AuthBusUnit: Retail |
|   Owner: Retail |
|   UserRole: Customer |
|   Time: 9:10 am |
|   Day: Wednesday |
|   Expiration: None |
|   Channel: Web |
|   ServiceType: Financial |
|   LocalOverride(s): None |
|   RuleActionPresence: None |

Figure 21:
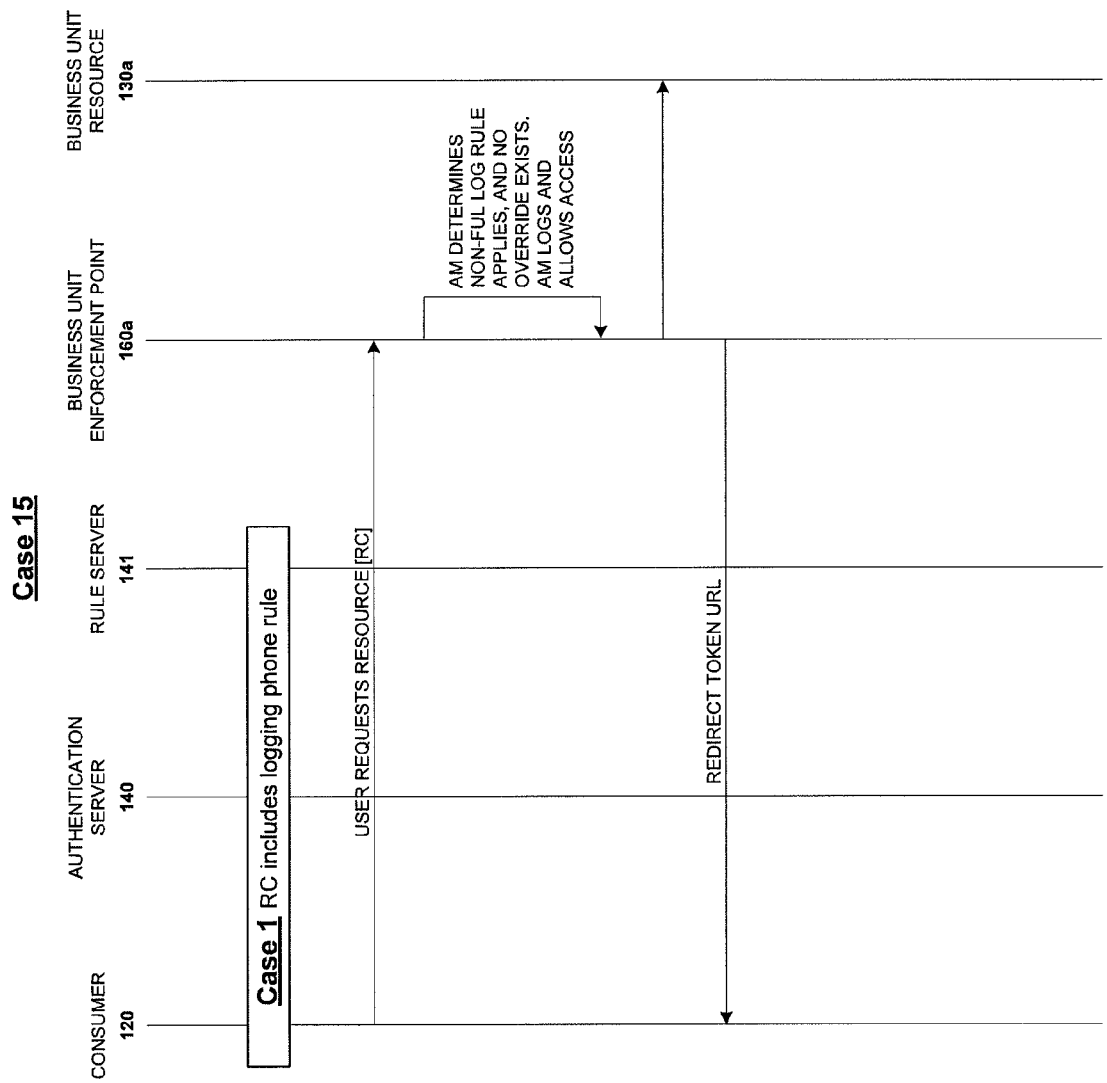

Use Case 15: Enterprise Creates Non-Fulfilling Logging Rule for Suspect Phone Number FIG. 21 illustrates a flow diagram depicting service provisioning when a logging rule applies to a suspect phone number. An enterprise determines that users entering their system using the phone number 999 555 1212 may be fraudulent. Rule acquisition processing creates and imposes a non-fulfilling rule on any user using this phone number. The rule requires every enforcement point to log additional information about users that have this rule. FIG. 21 illustrates how the rules are triggered and enforced for Use Case 15 as the user 120 navigates the network 100. Table XV below illustrates the rule and enforcement contexts and the authentication rule associated with Case 15.

TABLE XV

| Use Case 15 |
|---|
| RuleAcquisitionContext |
|   UserID: JohnQAdams |
|   AuthMethod: PhoneCust |
|   AuthBusUnit: Retail |
|   Channel |
|     Type: Phone |
|     Source: 999 555 1212 |

TABLE XV-continued

Use Case 15

```
        Agent: PhoneCo
        UserRole: Customer
    EnforcementContext
        AuthMethod: PhoneCust
        AuthBusUnit: Retail
        Owner: Retail
        UserRole: Customer
        Time: 9 am
        Day: Wednesday
        Expiration: None
        Channel: Phone
        ServiceType: Financial
        LocalOverride(s): None
        RuleActionPresence: None
    Rule Set (in eval order)
        Rule 1: Logging
    Rules Definition:
    Logging:
        TriggerSets(inclusive)
            Channel: Phone
            UserRole: N/A
            BusUnit: N/A
            Time: N/A
            Day: N/A
            Interval: N/A
            AuthMethod: N/A
            ServiceType: N/A
        RuleActionName: FraudLog
        RuleType: Informational
        GroupCode: 0
        PriorityCode: 1
        Satisfaction: NotSatis
        DefaultFulAction: FraudAct
        FulfillmentLoc: Local
        OptionalOverride: None
```

Use Case 16: Entity Mandates that Their Users Create a Non-SSN ID

Figure 22:
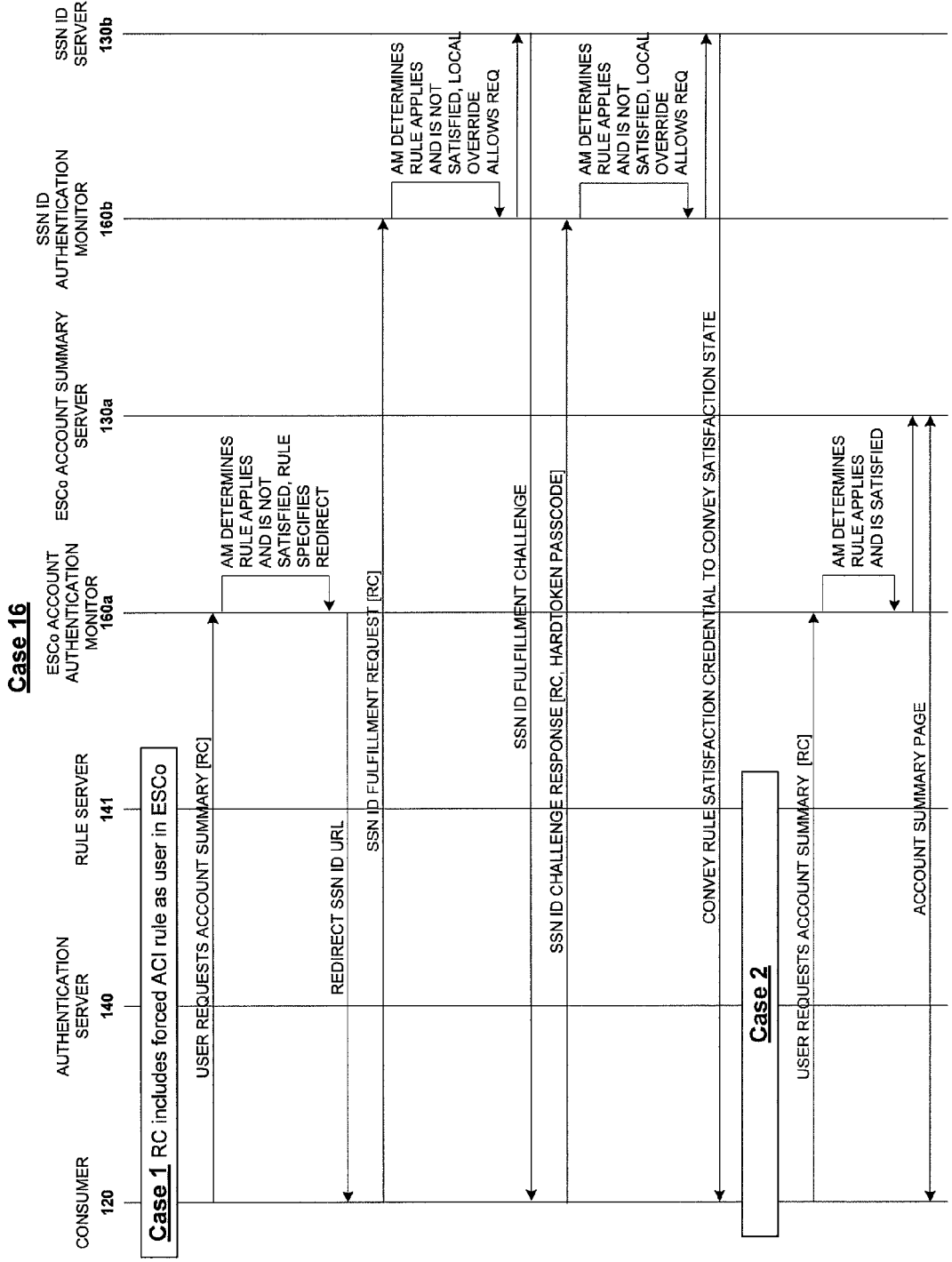

FIG. 22 illustrates a flow diagram depicting service provisioning using a forced ACI authentication rule. An entity (e.g., a client organization of an enterprise business unit) requires that its employees not use their social security number as their user ID for login. This forced ACI authentication rule applies to all users of the entity. When such a user attempts to login and the rule is not satisfied (i.e., the user's ID is their SSN), then the authentication rule requires the user to change their user ID to another non-SSN ID. Once the user changes their ID, the rule is always marked as fulfilled. Note, that if the user logs in via a different authentication method (offered by a different business unit), the rule will not be triggered and the user will not see the rule behavior. FIG. 22 illustrates how the rules are triggered and enforced for Use Case 16 as the user 120 navigates the network 100. Table XVI below illustrates the rule and enforcement contexts and the authentication rule associated with Case 16.

TABLE XVI

Use Case 16

```
RuleAcquisitionContext
    UserID: 000-00-0000
    AuthMethod: NBPart
    AuthBusUnit: ESCo
    Channel
        Type: Any
        Source: 127.0.0.1
        Agent: IE6.0.2019.7
        UserRole: Customer
```

TABLE XVI-continued

Use Case 16

```
    EnforcementContext
        AuthMethod: NBPart
        AuthBusUnit: ESCo
        Owner: ESCo
        UserRole: Customer
        Time: 9 am
        Day: Wednesday
        Expiration: None
        Channel: Any
        ServiceType: PersonalData
        LocalOverride(s): None
        RuleActionPresence: None
    Rule Set (in eval order)
        Rule 1: ForcedACI
    Rules Definition:
    ForcedACI:
        TriggerSets (inclusive)
            Channel: N/A
            UserRole: N/A
            BusUnit: ESCo
            Time: N/A
            Day: N/A
            Interval: N/A
            AuthMethod: NBPart
            ServiceType: N/A
        RuleActionName: ForcedACI
        RuleType: Persistent
        GroupCode: 0
        PriorityCode: 2
        Satisfaction: NotSatis
        DefaultFulAction: Redirect
        FulfillmentLoc: IDChangeURL
        OptionalOverride: None
```

Use Case 17: User has Multiple Hard Token Rules Grouped

An entity (e.g., Retail) can require its users to use Hard Token A to access their resources. Another entity (e.g., ESCo) can require its users to use Hard Token B to access their resources. The satisfaction of either rule satisfies both rules (i.e., the rules are grouped). A user who is a Retail user and an ESCo user will acquire both rules. If the user first enters the Retail Business Unit, they will be challenged to enter the value from Hard Token A. If they then enter the ESCo Business Unit, they will not be challenged to enter a Hard Token B value. Conversely, if the user first enters ESCo, they will be challenged to enter a Hard Token B value. If they subsequently enter the Retail Business Unit, they will not be challenged to enter a Hard Token A value. Table XVII below illustrates the rule and enforcement contexts and the authentication rule associated with Case 17.

TABLE XVII

Use Case 17

```
RuleAcquisitionContext
    UserID: GeneralUser
    AuthMethod: RetailCust
    AuthBusUnit: Retail
    Channel
        Type: Any
        Source: 127.0.0.1
        Agent: IE6.0.2019.7
        UserRole: Customer
    EnforcementContext
        AuthMethod: RetailCust
        AuthBusUnit: Retail
        Owner: Retail
        UserRole: Customer
        Time: 9 am
        Day: Wednesday
```

TABLE XVII-continued

Use Case 17

```
        Expiration: None
        Channel: Web
        ServiceType: PersonalData
        LocalOverride(s): None
        RuleActionPresence: None
    Rule Set (in eval order)
        Rule 1: HardToken A
        Rule 2: HardToken B
    Rules Definition:
    HardTokenA:
        TriggerSets(inclusive)
            BusUnit: Retail
        RuleActionName: HTokenAct
        RuleType: Session
        GroupCode: 1
        PriorityCode: 1
        Satisfaction: NotSatis
        DefaultFulAction: Redirect
        FulfillmentLoc: HTokenAURL
        OptionalOverride: None
    HardTokenB:
        TriggerSets (inclusive)
            BusUnit: ESCo
        RuleActionName: HTokenAct
        RuleType: Session
        GroupCode: 1
        PriorityCode: 1
        Satisfaction: NotSatis
        DefaultFulAction: Redirect
        FulfillmentLoc: HTokenBURL
        OptionalOverride: None
```

Use Case 18: Entity Mandates a Non-Fulfilling Redirection Rule for a User

Figure 23:
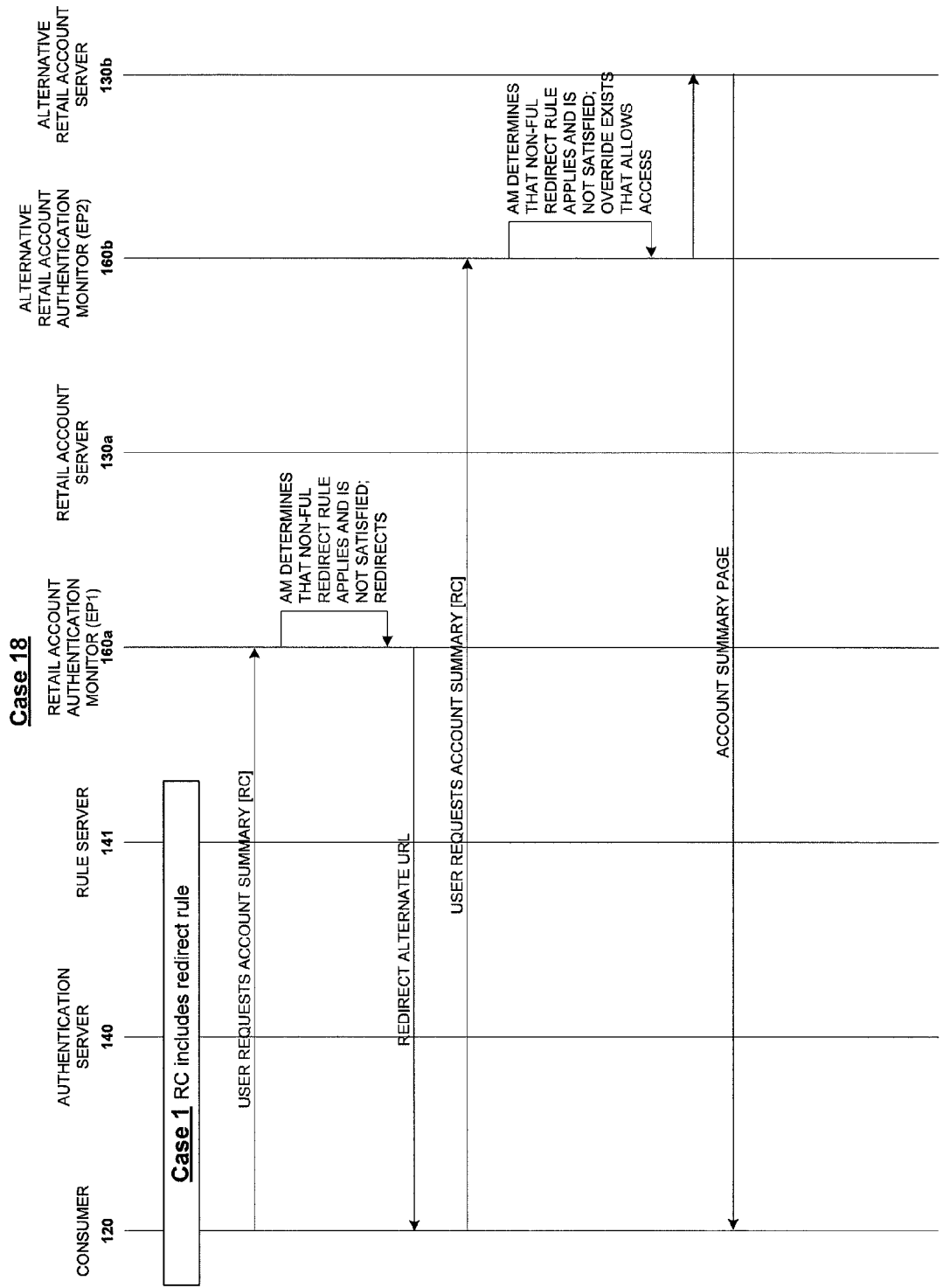

FIG. 23 illustrates a flow diagram depicting service provisioning using a redirect authentication rule. An entity can impose a non-fulfilling redirection rule on all users entering via the web from a specified IP address. When a user enters from the specified IP address, the rule acquisition process recognizes the address and associates the redirection rule with the user. The authentication rule, which remains unsatisfied after fulfillment, requires the enforcement point defending a protected resource to redirect the user to a different location. The policy of the enforcement point defending the second location overrides the default action and permits the request to enter. This use case can be used for redirecting a suspect user from a main site resource to a more heavily instrumented monitoring site. FIG. 23 illustrates how the rules are triggered and enforced for Use Case 18 as the user 120 navigates the network 100. Table XVIII below illustrates the rule and enforcement contexts and the authentication rule associated with Case 18.

TABLE XVIII

Use Case 18

```
RuleAcquisitionContext
    UserID: JohnQAdams
    AuthMethod: RetailCust
    AuthBusUnit: Retail
    Channel
        Type: Web
        Source: 127.0.0.1
        Agent: IE6.0.2019.7
        UserRole: Customer
EnforcementContext: EP1
    AuthMethod: RetailCust
    AuthBusUnit: Retail
    Owner: Wholesale
    UserRole: Customer
```

TABLE XVIII-continued

Use Case 18

```
    Time: 9 am
    Day: Wednesday
    Expiration: None
    Channel: Web
    ServiceType: PersonalData
    LocalOverride(s): None
    RuleActionPresence: None
Rule Set (in eval order)
    Rule 1: Redirection
Rules Definition:
Redirection:
    TriggerSets(inclusive)
        Channel: Web
    RuleActionName: RstrctAltSit
    RuleType: NavRestrict
    GroupCode: 0
    PriorityCode: 0
    Satisfaction: NotSatis
    DefaultFulAction: Redirect
    FulfillmentLoc: AltSiteURL
    OptionalOverride: None
    EnforcementContext: EP2
        AuthMethod: RetailCust
        AuthBusUnit: Retail
        Owner: Wholesale
        UserRole: Customer
        Time: 9:01 am
        Day: Wednesday
        Expiration: None
        Channel: Web
        ServiceType: Financial
        LocalOverride(s):
            RstrctAltSit-Admit/unsat.
        RuleActionPresence:
            RstrctAltSit
```

Use Case 19: Entity Mandates a Non-Fulfilling Logging Rule for a User

Figure 24:
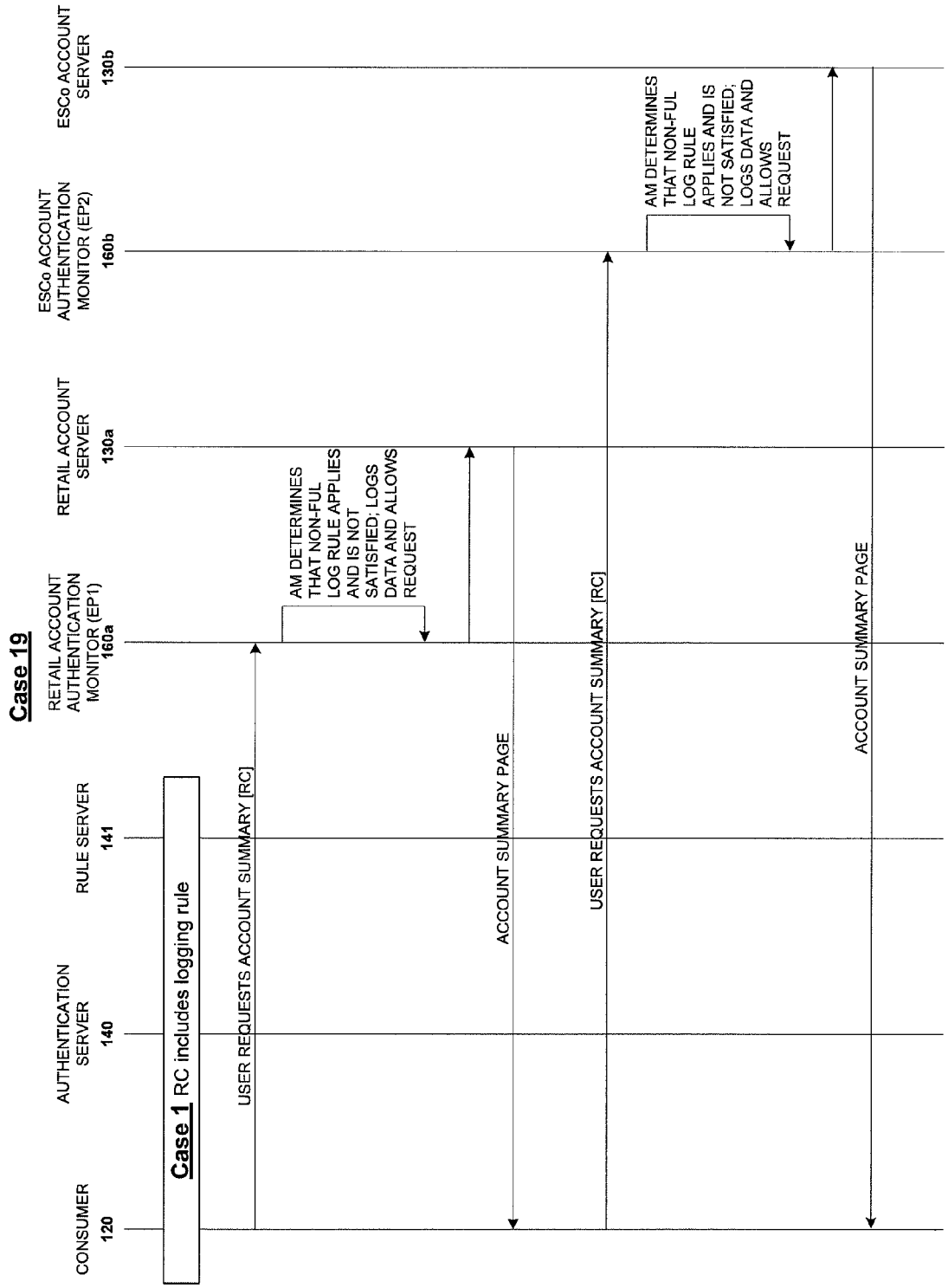

FIG. 24 illustrates a flow diagram depicting service provisioning using a logging authentication rule. An entity can impose a mandatory non-fulfilling authentication rule that requires enforcement points to log additional information when a user visits while using a browser of a particular type. When a user uses such a browser, the rule acquisition process detects this situation and associates the logging authentication rule with the user. The default rule action is to locally log additional user information. FIG. 24 illustrates how the rules are triggered and enforced for Use Case 19 as the user 120 navigates the network 100. Table XVIII below illustrates the rule and enforcement contexts and the authentication rule associated with Case 19.

TABLE XIX

Use Case 19

```
RuleAcquisitionContext
    UserID: JohnQAdams
    AuthMethod: RetailCust
    AuthBusUnit: Retail
    Channel
        Type: Web
        Source: 127.0.0.1
        Agent: IE6.0.2019.7
        UserRole: Customer
EnforcementContext
    AuthMethod: RetailCust
    AuthBusUnit: Retail
    Owner: Wholesale
    UserRole: Customer
    Day: Wednesday
    Channel: Web
    ServiceType: PersonalData
```

TABLE XIX-continued

Use Case 19

```
        LocalOverride(s): None
        RuleActionPresence: None
    Rule Set (in eval order)
        Rule 1: Logging
    Rules Definition:
    Logging:
        TriggerSets(inclusive)
            Channel: Web
            UserRole: N/A
            BusUnit: Retail, ESCo
            Time/Day: N/A
        RuleActionName: FraudLog
        RuleType: Informational
        GroupCode: 0
        PriorityCode: 0
        Satisfaction: NotSatis
        DefaultFulAction: Log
        FulfillmentLoc: Local
        OptionalOverride: None
```

Use Case 20: Entity Restricts Admin Access to Specific Source IP Addresses.

An entity (e.g., BigCo at ESCo Services) can impose a non-fulfilling redirection authentication rule on all administrative users entering the Enterprise Business Unit via the web. The authentication rule can be applied to any client or organization administration user that is entering from an IP address other than one of those specified as valid by the entity. When such a user enters from an IP address not provided by the entity, the rule acquisition process recognizes this condition and associates the redirection rule with the user. The authentication rule requires the enforcement point defending a protected Business Unit resource to redirect the user to a second location. For example, the second location can inform the user that access is prohibited. Table XX below illustrates the rule and enforcement contexts and the authentication rule associated with Case 20.

TABLE XX

Use Case 20

```
RuleAcquisitionContext
    UserID: JohnQAdams
    AuthMethod: NBPsw
    AuthBusUnit: ESCo
    Channel
        Type: Web
        Source: 127.0.0.1
        Agent: IE6.0.2019.7
        UserRole: Admin
EnforcementContext EP1
    AuthMethod: NBPsw
    AuthBusUnit: ESCo
    Owner: ESCo
    UserRole: Admin
    Channel: Web
    ServiceType: PersonalData
    LocalOverride(s): None
    RuleActionPresence: None
EnforcementContext EP1
    AuthMethod: NBPsw
    AuthBusUnit: ESCo
    Owner: ESCo
    UserRole: Admin
    Channel: Web
    ServiceType: PersonalData
    LocalOverride(s):
        non-approved
        IP Address: allow
    RuleActionPresence: None
```

TABLE XX-continued

Use Case 20

```
Rule Set (in eval order)
    Rule 1: Redirection
Rules Definition:
Redirection:
    TriggerSets(inclusive)
        Channel: Web
        UserRole: Admin
        BusUnit: ESCo
        Time/Day: N/A
    RuleActionName:
                RestrictToAltSite
    RuleType: NavRestrict
    GroupCode: 0
    PriorityCode: 0
    Satisfaction: NotSatis
    DefaultFulAction: Redirect
    FulfillmentLoc: AltSiteURL
    OptionalOverride: None
```

Use Case 21: High Net Worth Customer Forbids Web Access to Writable Data

Figure 25:
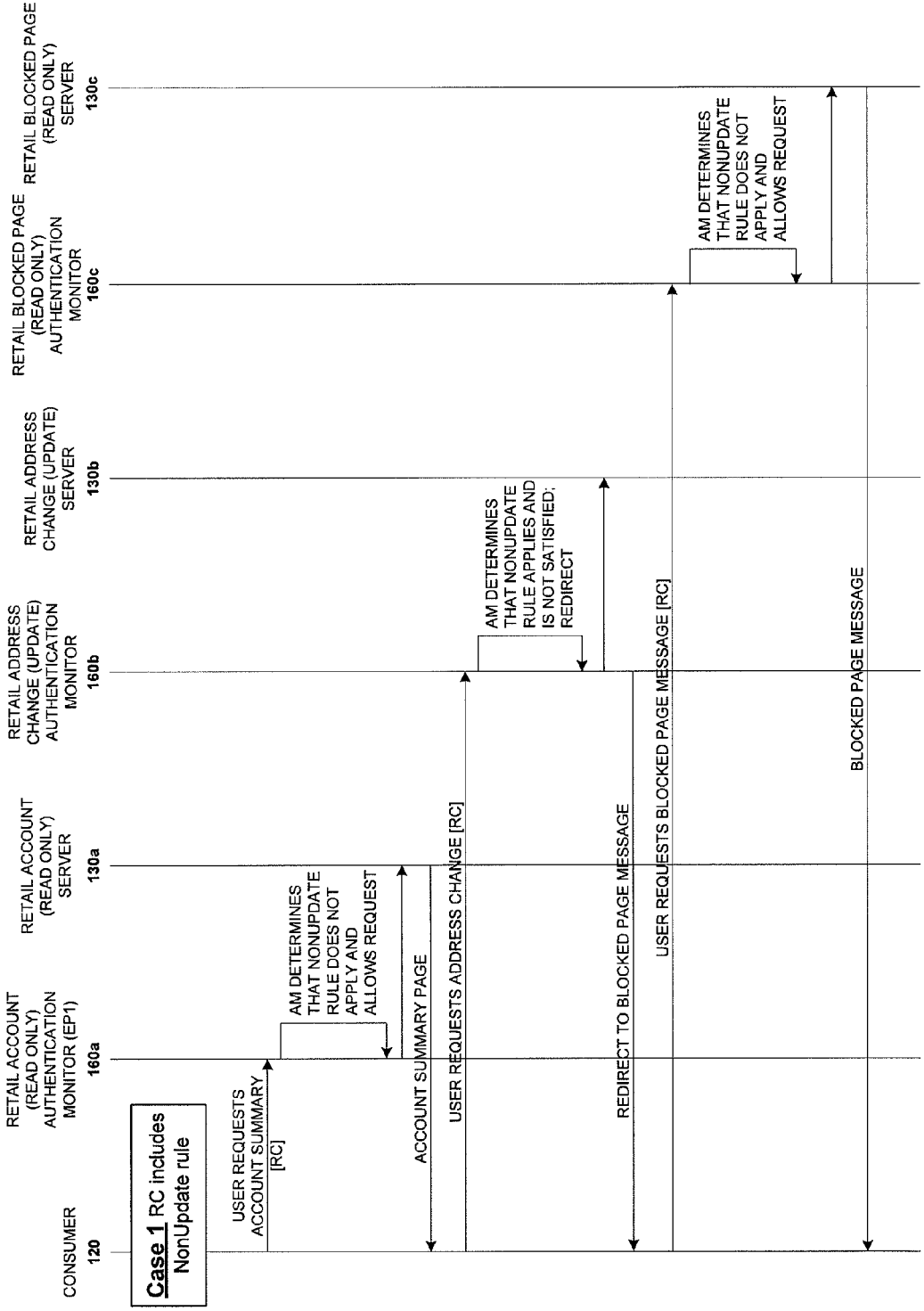

FIG. 25 illustrates a flow diagram depicting service provisioning using a high net worth customer defined authentication rule. A high net user (e.g., user "X") can create a non-update authentication rule that forbids access to resources that allow the user to change data via any web channel. This authentication rule can redirect the user to an access-blocked message and remain unfulfilled. FIG. 25 illustrates how the rules are triggered and enforced for Use Case 21 as the user 120 navigates the network 100. Table XXI below illustrates the rule and enforcement contexts and the authentication rule associated with Case 21.

TABLE XXI

Use Case 21

```
RuleAcquisitionContext
    UserID: X
    AuthMethod: NBPart
    AuthBusUnit: ESCo
    Channel
        Type: Web
        Source: 127.0.0.1
        Agent: IE6.0.2019.7
        UserRole: Admin
EnforcementContext Common
    AuthMethod: RetailCust
    AuthBusUnit: Retail
    Owner: Retail
    UserRole: Customer
    Day: Wednesday
    ExpirationTime: None
    Channel: Web
    LocalOverride(s): None
    RuleActionPresence: None
at EP1
    Time: 9 am
    ResourceType: Readable
at EP2
    Time: 9:01 am
    ResourceType: Writable
at EP3
    Time: 9:02 am
    ResourceType: Readable
Rule Set (in eval order)
    Rule 1: NonUpdate
Rules Definition:
NonUpdate:
    TriggerSets(inclusive)
        Channel: Web
        UserRole: N/A
        BusUnit: N/A
```

TABLE XXI-continued

Use Case 21

Time: N/A
Day: N/A
ResourceType: Writable
RuleActionName: Redirect
RuleType: NavRestrict
GroupCode: 0
PriorityCode: 4
Satisfaction: NotSatis
DefaultFulAction: Redirect
FulfillmentLoc: BlockURL
OptionalOverride: None Use Case 22: Entity Mandates a Hard Token Time Rule An entity can impose a hard token time rule on all users that requires the user to enter a hard token value if the user attempts to make a trade while the stock market is open. The authentication rule requires the enforcement point defending a protected resource to redirect the user to a hard token fulfillment location if the current time is while the stock market is open and the rule is not satisfied. The policy of the enforcement point defending the fulfillment location overrides the default action and permits the request to enter. During after market hours, for example, the user is not required to enter a hard token since the trade will be executed at the next market open period. Table XXII below illustrates the rule and enforcement contexts and the authentication rule associated with Case 22.

TABLE XXII

Use Case 22

RuleAcquisitionContext
  UserID: JohnQAdams
  AuthMethod: RetailCust
  AuthBusUnit: Retail
  Channel
    Type: Web
    Source: 127.0.0.1
    Agent: IE6.0.2019.7
  UserRole: Admin
EnforcementContext Common
  AuthMethod: RetailCust
  AuthBusUnit: Retail
  Owner: Retail
  UserRole: Customer
  Day: Wednesday
  ExpirationTime: None
  Channel: Web
  ResourceType: EquityTrade
  LocalOverride(s): None
  RuleActionPresence: None
Rule Set (in eval order)
  Rule 1: HTokenTime
Rules Definition:
HTokenTime:
  TriggerSets(inclusive)
    Channel: Web
    UserRole: Customer
    BusUnit: N/A
    Time: 9-4:30
    Day: M, Tu, W, Th, F
    Interval: N/A
    ResourceType:
      EquityTrade
  RuleActionName: HTokenTime
  RuleType: Session
  GroupCode: 0
  PriorityCode: 1
  Satisfaction: NotSatis
  DefaultFulAction: Redirect TABLE XXII-continued Use Case 22

FulfillmentLoc: HTokenURL
  OptionalOverride: None

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and the computer program can be deployed in any form, including as a stand-alone program or as a subroutine, element, or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry, e.g., an FPGA (field programmable gate array) or an ASIC (application-specific integrated circuit). Subroutines can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD, DVD, and HD-DVD disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for providing authentication for service provisioning, the method comprising:
   receiving, by a computing device, a request from a user for a portable rules credential for the user;
   selecting, by the computing device, one or more authentication rules associated with the user, each of the one or more authentication rules includes a corresponding trigger criteria, satisfaction state and fulfillment instruction, wherein the trigger criteria specifies whether the corresponding authentication rule applies at a particular enforcement point, wherein the satisfaction state indicates whether the corresponding authentication rule is satisfied, and wherein the fulfillment instructions defines one or more steps that at least one data processing apparatus performs to fulfill the corresponding authentication rule;
   generating, by the computing device, a portable rules credential, the portable rules credential including one or more of the one or more authentication rules; and
   transmitting, by the computing device, the portable rules credential to the user.

2. The method of claim 1, wherein the portable rules credential is generated prior to requesting access to an enforcement point.

3. The method of claim 1, wherein selecting the one or more authentication rules associated with the user is based on one or more characteristics of the user comprising an identification credential of the user, an identification credential of a group of users including the user, or any combination thereof.

4. The method of claim 3, wherein the group of users comprises: one or more employees of an organization, one or more customers of the organization, or any combination thereof.

5. The method of claim 1, wherein selecting the one or more authentication rules associated with the user is based on a characteristic of the request comprising: an access-channel characteristic, an access-point characteristic, a device characteristic, or any combination thereof.

6. The method of claim 5 further comprising selecting one of the one or more authentication rules based on the access-channel characteristic when the user sends the request in: a web message, a universal resource locator (URL) message, electronic mail, text messaging, instant messaging, a session initiation protocol (SIP) message, a short message service (SMS) message, a multimedia messaging service (MMS) message, an enhanced messaging service (EMS) message, an IP multimedia system (IMS) message, a live voice call, an automated voice call, an interactive voice response (IVR) call, or any combination thereof.

7. The method of claim 5 further comprising selecting one of the one or more authentication rules based on the access-point characteristic when the request originates from a specified network access-point, the specified network access-point comprising: an IP address, a network IP address, a telephone number, an area code, a country code, or any combination thereof.

8. The method of claim 5 further comprising selecting one of the one or more authentication rules based on the device characteristic when the request originates from a specified device, the specified device characterized by a software characteristic or a hardware characteristic.

9. The method of claim 1, wherein selecting the one or more authentication rules associated with the user is based on a characteristic of the acquisition point comprising: a time characteristic, a policy characteristic, a service type characteristic, a function type characteristic, or any combination thereof.

10. The method of claim 9 further comprising selecting the one or more authentication rules based on the time characteristic when the request is received during: a specified time range, a specified day of the week, a specified set of dates, or any combination thereof.

11. The method of claim 9 further comprising selecting the one or more rules based on the service type characteristic when a first service being requested by the user is associated with: a retail services type, an employment services type, an insurance services type, or any combination thereof.

12. The method of claim 9 further comprising selecting one or more authentication rules based on the function type characteristic when a first service being requested by the user is associated with: a financial service, an accounting service, a personnel service, an administrative service, a trade service, or any combination thereof.

13. The method of claim 1, wherein the trigger criteria comprises: a user trigger, a request trigger, an enforcement point trigger, a policy trigger, or any combination thereof.

14. The method of claim 13, wherein the user trigger comprises an identification credential of the user, an identification credential of a group of users including the user, or any combination thereof.

15. The method of claim 13, wherein the request trigger comprises: an access-channel trigger, an access-point trigger, a device trigger, or any combination thereof.

16. The method of claim 13, wherein the enforcement point trigger comprises: a time trigger, a service type trigger, a function trigger, an expiration-of-time trigger, or any combination thereof.

17. The method of claim 1 further comprising:
   receiving, from the user, a request for a first service at an enforcement point;
   determining, by the enforcement point, if any of the one or more authentication rules in the portable rules credential applies at the enforcement point;
   determining, by the enforcement point, if the user satisfies each of the one or more authentication rules in the portable rules credential that applies at the enforcement point; and executing fulfillment instructions for each of the one or more authentication rules in the portable rules credential that are not satisfied.

18. The method of claim 17, wherein the fulfillment instructions include an authentication action comprising: a hard token action, a soft token action, a personal identification number (PIN) action, a password (PW) action, a knowledge action, a biometric action, a modify-user information action, or any combination thereof.

19. The method of claim 17, wherein executing the fulfillment instructions include an authentication action comprising directing the user to a site different from the enforcement point.

20. The method of claim 17, wherein executing the fulfillment instructions comprises executing a supplemental action when the user accesses the first service.

21. The method of claim 17 further comprising modifying a satisfaction state of the each of the one or more authentication rules applied at the enforcement point based on a result of the fulfillment instructions.

22. The method of claim 1 further comprising:
receiving, from the user, a request for a first service at an enforcement point;
determining, by the enforcement point, if any of the one or more authentication rules in the portable rules credential applies at the enforcement point;
determining, by the enforcement point, if all the one or more executable authentication rules in the portable rules credential is satisfied; and
providing access, by the enforcement point, to a first service if the user does not satisfy all of the authentication rules in the portable rules credential.

23. The method of claim 22, wherein the first service comprises an authentication service for satisfying each of the one or more authentication rules that is not satisfied.

24. The method of claim 1, wherein the one or more executable authentication rules comprise: a mandatory configurable rule, an optional configurable rule, a mandatory non-configurable rule, an optional non-configurable rule, or any combination thereof.

25. The method of claim 1 wherein the satisfaction state is determined based on a particular resource the user is attempting to access.

26. The method of claim 1 further comprising:
receiving, by an enforcement point, the portable rules credential from the user; and
verifying, by the enforcement point, the satisfaction state of each of the one or more authentication rules in the portable rule credential based on the trigger criteria.

27. A computer program product, tangibly embodied in machine-readable storage device, the computer program product including instructions being operable to cause data processing apparatus to:
receive a request from a user for a portable rules credential for the user;
selecting one or more authentication rules associated with the user, each of the one or more authentication rules includes a corresponding trigger criteria, satisfaction state and fulfillment instruction,
wherein the trigger criteria specifies whether the corresponding authentication rule applies at a particular enforcement point, wherein the satisfaction state indicates whether the corresponding authentication rule is satisfied, and wherein the fulfillment instructions
defines one or more steps that at least one data processing apparatus performs to fulfill the corresponding authentication rule;
generate a portable rules credential, the portable rules credential including one or more of the one or more authentication rules; and
transmit the portable rules credential to the user.

28. A system for providing authentication for service provisioning, the system comprising:
an authentication system including a computer processing device; and
a machine-readable storage device including instructions being operable to cause the computer processing device to:
receive a request from a user for a portable rules credential for the user;
selecting one or more authentication rules associated with the user, each of the one or more authentication rules includes a corresponding trigger criteria, satisfaction state and fulfillment instruction,
wherein the trigger criteria specifies whether the corresponding authentication rule applies at a particular enforcement point, wherein the satisfaction state indicates whether the corresponding authentication rule is satisfied, and wherein the fulfillment instructions
defines one or more steps that at least one data processing apparatus performs to fulfill the corresponding authentication rule;
generate a portable rules credential, the portable rules credential including one or more of the one or more authentication rules; and
transmit the portable rules credential to the user.

* * * * *